US012393273B1

(12) United States Patent
Yildiz et al.

(10) Patent No.: US 12,393,273 B1
(45) Date of Patent: Aug. 19, 2025

(54) DYNAMIC RECORDING OF AN EXPERIENCE BASED ON AN EMOTIONAL STATE AND A SCENE UNDERSTANDING

(71) Applicant: Apple Inc., Cupertino, CA (US)

(72) Inventors: Izzet B. Yildiz, Sunnyvale, CA (US); Nicholas C. Soldner, Los Altos, CA (US); Grant H. Mulliken, Los Gatos, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 18/371,826

(22) Filed: Sep. 22, 2023

Related U.S. Application Data

(60) Provisional application No. 63/409,415, filed on Sep. 23, 2022.

(51) Int. Cl.
*G06F 3/01* (2006.01)
*G06T 19/00* (2011.01)

(52) U.S. Cl.
CPC .............. *G06F 3/015* (2013.01); *G06F 3/012* (2013.01); *G06F 3/013* (2013.01); *G06T 19/00* (2013.01); *G06F 2203/011* (2013.01)

(58) Field of Classification Search
CPC ....................................................... G06F 3/015
See application file for complete search history.

(56) References Cited

U.S. PATENT DOCUMENTS 10,120,413 B2 11/2018 Aimone et al.
10,127,728 B2 11/2018 Osman 10,800,043 B2 10/2020 Park et al.
10,860,103 B2 12/2020 Kacelenga
(Continued)

FOREIGN PATENT DOCUMENTS

CN 110874869 B 11/2020
WO 2018121463 7/2018
(Continued)

OTHER PUBLICATIONS

Jiang, Shiqi, Zhou, Pengfei, LI, Zhenjiang and Li, Mo; "Memento: An Emotion Driven Lifelogging System with Wearables"; 2017—pp. 1-9.
(Continued)

*Primary Examiner* — Chun-Nan Lin
(74) *Attorney, Agent, or Firm* — Thompson Hine LLP

(57) ABSTRACT

Various implementations disclosed herein include devices, systems, and methods that determine to record an event based on an emotional state and a scene understanding of an environment. For example, an example process may include obtaining physiological data or behavioral data during a first period of time utilizing the one or more sensors. The process may further include determining an emotional state during the first period of time based on the physiological data or the behavioral data (e.g., elated, happy, etc.). The process may further include determining a scene understanding of an environment based on identifying one or more objects in the environment utilizing the one or more sensors. The process may further include determining to record an event occurring in the environment (e.g., positively valenced events, objects, or situations) based on the emotional state and the scene understanding and record the event utilizing one or more sensors.

23 Claims, 9 Drawing Sheets

(56) References Cited

U.S. PATENT DOCUMENTS

| | | |
|---|---|---|
| 11,762,457 B1 | 9/2023 | Ikkai |
| 12,277,262 B1 | 4/2025 | Ikkai |
| 2014/0201207 A1 | 7/2014 | Sadowsky et al. |
| 2015/0208986 A1 | 7/2015 | Gottesman |
| 2017/0007165 A1 | 1/2017 | Jain et al. |
| 2017/0337742 A1 | 11/2017 | Powderly et al. |
| 2018/0189568 A1 | 7/2018 | Powderly et al. |
| 2018/0255167 A1 | 9/2018 | Saito |
| 2019/0019089 A1 | 1/2019 | Baughman et al. |
| 2019/0138096 A1 | 5/2019 | Lee et al. |
| 2019/0163258 A1 | 5/2019 | Baughman et al. |
| 2019/0206440 A1* | 7/2019 | Newell .................. H04N 21/47 |
| 2019/0208287 A1* | 7/2019 | Newell ................ H04N 21/854 |
| 2019/0223746 A1 | 7/2019 | Intrator |
| 2019/0384392 A1 | 12/2019 | Aimone et al. |
| 2020/0008725 A1 | 1/2020 | Bach et al. |
| 2020/0057783 A1 | 2/2020 | Ricci |
| 2020/0175123 A1* | 6/2020 | Roberts ................... G06F 3/015 |
| 2020/0201434 A1* | 6/2020 | Aliamiri ................ G06N 3/088 |
| 2020/0356136 A1 | 11/2020 | Aimone et al. |
| 2020/0373001 A1 | 11/2020 | Harrison et al. |
| 2021/0400142 A1 | 12/2021 | Jorasch |
| 2023/0355090 A1* | 11/2023 | Badik .................... A61B 5/486 |
| 2024/0164672 A1 | 5/2024 | Pasley |

FOREIGN PATENT DOCUMENTS

| | | |
|---|---|---|
| WO | 2019067731 A1 | 4/2019 |
| WO | 2020175759 A1 | 9/2020 |
| WO | 2022212052 A1 | 10/2022 |

OTHER PUBLICATIONS

Parsons, T.D. and Reinebold, J.L., "Adaptive Virtual Environments for Neuropsychological Assessment in Serious Games," IEEE Transactions on Consumer Electronics, vol. 58, No. 2, pp. 197-204, May 2012 2012.

\* cited by examiner

DYNAMIC RECORDING OF AN EXPERIENCE BASED ON AN EMOTIONAL STATE AND A SCENE UNDERSTANDING

CROSS-REFERENCE TO RELATED APPLICATION

This Application claims the benefit of U.S. Provisional Application Ser. No. 63/409,415 filed Sep. 23, 2022, which is incorporated herein in its entirety.

TECHNICAL FIELD

The present disclosure generally relates to presenting content via electronic devices, and in particular, to systems, methods, and devices that record events based on an emotional state and a scene understanding.

BACKGROUND

Electronic devices may be used to engage in various experiences in which a variety of emotional states may be exhibited. For instance, there are key moments or events that may be of personal importance because the moment or event is exciting, happy, or peaceful for a brief amount of time (e.g., spending a birthday with loved ones or watching the sunset at a favorite beach). Some of these moments/events may be captured by personal cameras and re-visited through photos or videos which can provide a recollection of good memories and associated emotions that may help people cheer up and stay positive. However, there are many other positive moments that may not be captured because the events were either unexpected or their value was not realized at that moment. As mixed reality (MR) becomes an improved and mainstream communication and social interaction medium, and provides more immersive experiences, people will have considerable amount of emotional moments that they may want to capture. In some situations, they may not be aware of the importance of the moment or prefer to live the moment instead of being worried about recording it. Thus, it would be desirable for an electronic device to able to record/capture an event automatically to be reviewed later without having to interrupt a current immersive experience to initiate such a recording.

SUMMARY

Various implementations disclosed herein include devices, systems, and methods that determine to record an event based on determining an emotional state of a user and a scene understanding of an environment. For example, physiological data/signals (e.g., eye-tracking, pupil diameter, heart rate, respiratory rate, galvanic skin response, face/body temperature), neural (EEG, fNIRS) and/or behavioral data/signals (e.g., facial gestures, voice recognition, etc.) may be utilized to identify an emotional state (e.g., elated, happy, euphoric, excited, etc.) and record moments of personal importance (e.g., record emotional moments such as birthdays or other positively valenced events, objects, or situations) based on the determined emotional state and a scene understanding. The environment may be a physical environment, a virtual environment, or a mixed reality (MR) environment (also referred to herein as an extended reality (XR) environment). In some implementations, the recordings may be from a user's point of view (e.g., via a head-mounted device (HMD)).

In some implementations, the techniques described herein may utilize the determined emotional state and the scene understanding (e.g., identification and location of objects within an environment) to tailor a dynamic/closed loop experience. For example, positively valenced events may trigger a recording of emotionally significant content because a user may exhibit positively valenced emotions (e.g., elated, happy, euphoric, excited, etc.). By recording positively valenced events, users will have an opportunity to automatically record and save the best moments of his or her experience automatically. In some implementations, the techniques described herein may provide occasional positive reinforcement using the captured positively valenced moments in order to help manage stress and anxiety. Additionally, these recorded experiences may be shared with friends and family members similar to shared photos and videos.

A user's emotional state while viewing and/or listening to content on an electronic device can have a significant effect on the user's experience. For example, positively valenced emotions/moments may be important for particular meaningful experiences, such as enjoying family events, or partaking in a peaceful meditation session, watching educational or entertaining content, learning a new skill (e.g., cooking), and the like. Improved techniques for assessing emotional states while viewing and interacting with content and/or an environment (e.g., real-world physical environment, a virtual environment, or a mixed environment) may enhance a user's enjoyment, comprehension, and learning of the content. Moreover, content may not be presented in a way that makes sense to a particular user. Content creators and systems may be able to provide better and more tailored user experiences that a user is more likely to enjoy, comprehend, and learn from based on emotional state information (e.g., a more meaningful experience).

In an exemplary implementation, devices, systems, and methods facilitate recording events based on tracking an emotional state using physiological sensors and behavioral tracking sensors. The recorded events may be used a later time to in order to help manage stress and anxiety. The system may identify a baseline emotional state and a goal emotional state and enhance the experience to achieve the goal. In addition to respiration and attention, sensor data may be used to determine electroencephalography (EEG), temperature (e.g., on nose), heartrate (e.g., on forehead), and the like. In some implementations, content enhancement may be utilized based on a characteristic of an environment of the user (e.g., real-world physical environment, a virtual environment, or a combination of each). The device (e.g., a handheld, laptop, desktop, or HMD) provides content (e.g., a visual and/or auditory experience) corresponding to the real-world physical environment, a virtual reality environment, or a combination of such environments to the user. The content (e.g., an XR environment) may be enhanced visual/audio content and guidance that provides a closed loop experience based on real time bio-feedback.

In some implementations, the device obtains, with one or more sensors, physiological data (e.g., respiratory data, image data (facial, body, etc.), EEG amplitude, pupil modulation, eye gaze saccades, etc.) and behavioral signals (e.g., facial gestures based on image data, voice recognition based on acquired audio signals, etc.) associated with the user. Based on the obtained physiological data, some of the techniques described herein determine an emotional state (e.g., positively valenced emotions such as elated, happy, euphoric, excited, etc., or negatively valenced emotions such as sad, depressed, despair, etc.) during an experience (e.g., a family event, such as a birthday). For example, based on the physiological data and/or behavior data, the techniques can provide feedback to the user that the current emotional state differs from an intended state of the experience, recommend similar content or similar portions of the experience, and/or adjust, enhance, or otherwise modify the content. For example, techniques may provide a viewing of a recording of a positive experience (e.g., a previously captured happy memory) if the user is detected to be currently in a negative emotional state (e.g., sad, depressed, despair, etc.).

Some implementations improve user experiences by recording positively valenced events that minimize or avoid interrupting or disturbing user experiences, for example, without significantly interrupting a user's attention or ability to perform a task or enjoy the experience. For example, recording the experience without visually interrupting the view of the user during the event (e.g., showing a small recording symbol in top right of the view, but not interrupting the use during the experience).

Physiological data, such as EEG amplitude/frequency, pupil modulation, eye gaze saccades, etc., and/or behavioral data can depend on the emotional state of an individual and characteristics of the scene in front of him or her and the content enhancement that is presented therein. A physiological response and/or behavioral response can be obtained while using a device with eye tracking technology during an experience (e.g., a birthday party, an instructional cooking video, etc.). In some implementations, physiological response data can be obtained using other sensors, such as EEG sensors. Observing repeated measures of physiological response data to an experience can give insights about the underlying emotional state at different time scales. These metrics of emotion based on physiological and behavioral data can be used to provide feedback during an experience.

In some implementations, meditation may be recommended (e.g., at a particular time, place, task, etc.) based on the emotional state (e.g., sad, angry, despair, etc.) and based on various factors (e.g., physical environment context, scene understanding of what the user is seeing in an XR environment, and the like). Other experiences can utilize the techniques described herein regarding recording events based on an emotional state and a scene understanding. For example, an educational experience could record a pupil's experience that he or she seemed to enjoy learning about. Another example may be an entertainment experience that could record a user's experience that he or she seemed to be very excited during (e.g., recording a particular portion of a user while playing a video game). The techniques described herein can be customized to any user and experience that may need some type of content enhancement to enter or maintain one or more particular emotional states.

Some implementations assess physiological data and other user information to help improve a user experience. In such processes, user preferences and privacy should be respected, as examples, by ensuring the user understands and consents to the use of user data, understands what types of user data are used, has control over the collection and use of user data and limiting distribution of user data, for example, by ensuring that user data is processed locally on the user's device. Users should have the option to opt in or out with respect to whether their user data is obtained or used or to otherwise turn on and off any features that obtain or use user information. Moreover, each user should have the ability to access and otherwise find out anything that the system has collected or determined about him or her.

In general, one innovative aspect of the subject matter described in this specification can be embodied in methods, at a device having a processor and one or more sensors, that include the actions of obtaining physiological data or behavioral data during a first period of time utilizing the one or more sensors. The actions may further include determining an emotional state during the first period of time based on the physiological data or the behavioral data. The actions may further include determining a scene understanding of an environment, wherein the scene understanding is determined based on identifying one or more objects in the environment utilizing the one or more sensors. The actions may further include determining to record an event occurring in the environment based on the emotional state and the scene understanding. The actions may further include recording the event utilizing the one or more sensors.

These and other embodiments can each optionally include one or more of the following features.

In some aspects, the actions further include providing feedback based on determining the emotional state. In some aspects, the actions further include presenting the recording of the event. In some aspects, the actions further include determining a second emotional state during a second period of time based on the physiological data or the behavioral data, and providing a recommendation to present the recording of the event of the first period of time based on the second emotional state.

In some aspects, the emotional state during the second period of time includes a negatively valenced state. In some aspects, the recording of the event is based on a point of view of the device. In some aspects, the emotional state includes a positively valenced state.

In some aspects, the recording of the event includes a visual or audible representation of the emotional state or a change to the emotional state. In some aspects, the recording of the event includes a cue configured to trigger a change in the emotional state. In some aspects, the recording of the event includes a graphical indicator or sound configured to change a first emotional state to a second emotional state.

In some aspects, the emotional state is determined based on using the physiological data to determine head pose, sounds, jaw movement, cheek movement, nose movement, movement of tissue surrounding an eye, or a signal of a face. In some aspects, the emotional state is determined based on using the physiological data to measure gaze or body movements. In some aspects, the emotional state is determined based on determining a level of positively valenced emotion corresponding to the emotional state.

In some aspects, the actions further include identifying the recording of the event for the first period of time as a highly positively valenced event based on a comparison of the level of the positively valenced emotion corresponding to the emotional state to a positively valenced threshold.

In some aspects, the actions further include determining to end the recording of the event for the first period of time based on a criterion.

In some aspects, determining the scene understanding of the environment includes determining a position for the one or more objects.

In some aspects, recording the event includes modifying an appearance of the one or more objects based on the position for the one or more objects.

In some aspects, determining the scene understanding of the environment includes determining a context associated with a use of the device in the environment based on sensor data from the one or more sensors.

In some aspects, determining to record the event occurring in the environment is based on using a machine learning classifier model, wherein the physiological data or the behavioral data are input into the machine learning classification model to identify one or more emotional events.

In some aspects, the actions further include presenting an instruction for the user to be attentive to a physical action, assessing a level of positively valenced emotion to the physical action based on the physiological data or behavioral data and the emotional state, and presenting an updated sequence of content that is modified based on the level of positively valenced emotion.

In some aspects, the actions further include determining a baseline corresponding to the emotional state based on the physiological data or behavioral data, determining a goal based on the baseline, and modifying a presentation of content associated with a second event based on the baseline and the goal.

In some aspects, the recording of the event is presented to multiple users during a communication session. In some aspects, the environment is a physical environment, an extended reality (XR) environment, or a virtual environment.

In some aspects, the electronic device is a head-mounted device (HMD).

In accordance with some implementations, a non-transitory computer readable storage medium has stored therein instructions that are computer-executable to perform or cause performance of any of the methods described herein. In accordance with some implementations, a device includes one or more processors, a non-transitory memory, and one or more programs; the one or more programs are stored in the non-transitory memory and configured to be executed by the one or more processors and the one or more programs include instructions for performing or causing performance of any of the methods described herein.

BRIEF DESCRIPTION OF THE DRAWINGS

So that the present disclosure can be understood by those of ordinary skill in the art, a more detailed description may be had by reference to aspects of some illustrative implementations, some of which are shown in the accompanying drawings.

Figure 1:
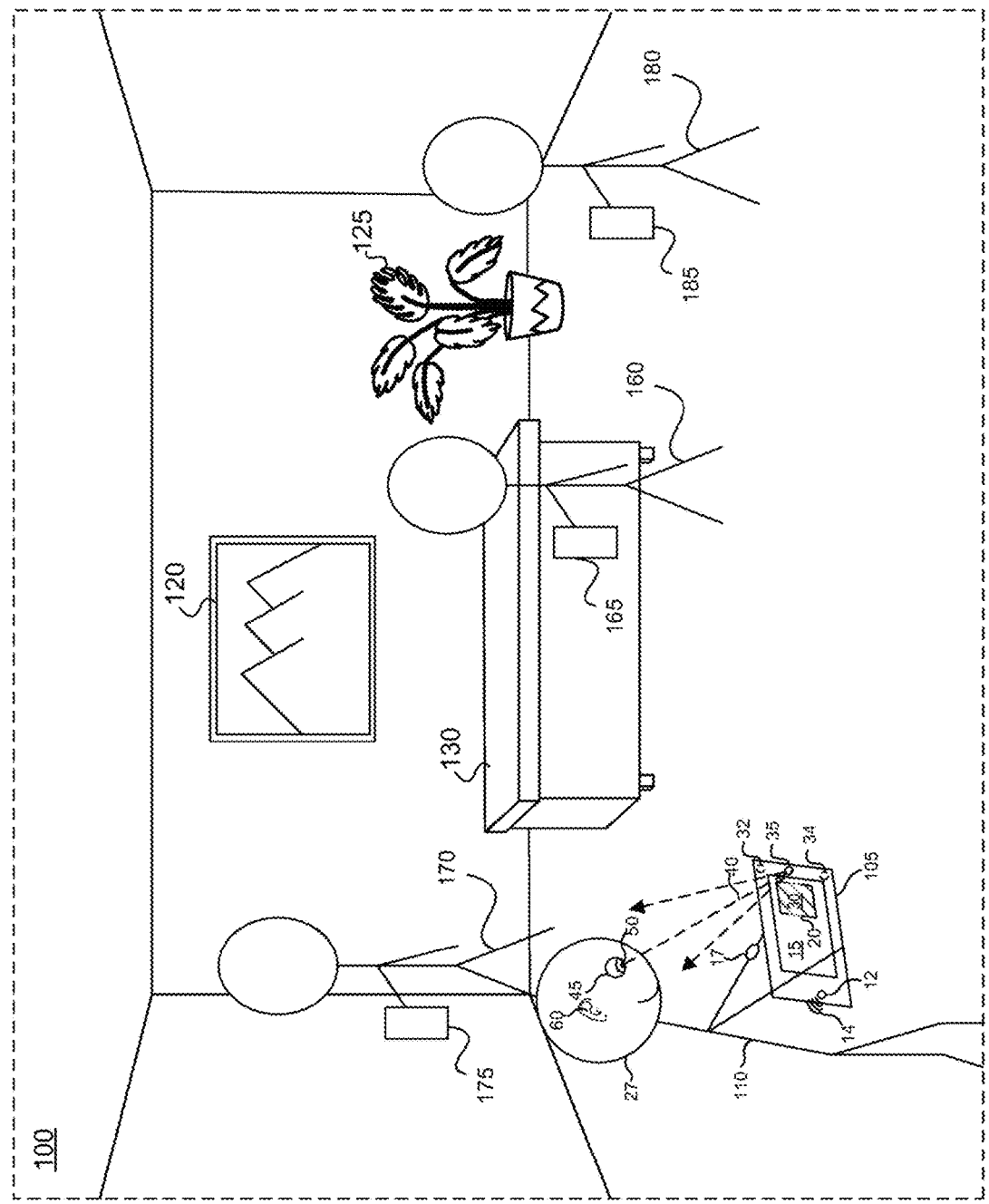
FIG. 1 illustrates a device presenting a visual and/or auditory experience and obtaining physiological data from a user in accordance with some implementations.

In accordance with common practice the various features illustrated in the drawings may not be drawn to scale. Accordingly, the dimensions of the various features may be arbitrarily expanded or reduced for clarity. In addition, some of the drawings may not depict all of the components of a given system, method or device. Finally, like reference numerals may be used to denote like features throughout the specification and figures.

DESCRIPTION

Numerous details are described in order to provide a thorough understanding of the example implementations shown in the drawings. However, the drawings merely show some example aspects of the present disclosure and are therefore not to be considered limiting. Those of ordinary skill in the art will appreciate that other effective aspects or variants do not include all of the specific details described herein. Moreover, well-known systems, methods, components, devices and circuits have not been described in exhaustive detail so as not to obscure more pertinent aspects of the example implementations described herein.

FIG. 1 illustrates a real-world physical environment 100 including a device 105 with a display 15. In some implementations, the device 105 displays content 20 to a user 110, and a visual characteristic 30 that is associated with content 20. For example, content 20 may be a button, a user interface icon, a text box, a graphic, etc. In some implementations, the visual characteristic 30 associated with content 20 includes visual characteristics such as hue, saturation, size, shape, spatial frequency, motion, highlighting, etc. For example, content 20 may be displayed with a visual characteristic 30 of a color highlighting covering or surrounding content 20.

In some implementations, content 20 may be a visual experience, and the visual characteristic 30 of the visual experience may continuously change during the visual experience. As used herein, the phrase "experience" refers to a period of time during which a user uses an electronic device that measures one or more emotional states using physiological data or behavioral data streams. In one example, a user has an experience in which the user perceives a real-world physical environment while holding, wearing, or being proximate to an electronic device that includes one or more sensors that obtain physiological data or behavioral data that is indicative of the emotional state. In another example, a user has an experience in which the user perceives content displayed by an electronic device while the same or another electronic obtains physiological data or behavioral data to assess the emotional state. In another example, a user has an experience in which the user holds, wears, or is proximate to an electronic device that provides a series of audible or visual instructions that guide the experience. For example, the instructions may instruct the user to maintain or try to maintain a particular respiratory state (e.g., 7 breaths per minute (BPM)) and emotional state (e.g., focus on a particular visual and/or audio element) during particular time segments of the experience. For example, instructing the user to focus on his or her breathing and paying attention to a particular portion of a meditation video, etc. During such an experience, the same or another electronic device may obtain physiological data and/or behavioral data from one or more sensors to assess the emotional state.

In some implementations, the visual characteristic 30 is a content enhancement or content modification for the user that is specific to the experience (e.g., a visual or audio cue that the current view or content 20 is being recorded, or an indication to focus on a particular task during an experience, such as paying attention during a particular part of an education/learning experience). In some implementations, the visual experience (e.g., content 20) can occupy the entire display area of display 15. For example, during a meditation experience, content 20 may be a video or sequence of images that may include visual and/or audio cues as the visual characteristic 30 presented to the user to pay attention to a particular moment or event. Other visual experiences that can be displayed for content 20 and visual and/or audio cues for the visual characteristic 30 will be further discussed herein.

The device 105 obtains physiological data (e.g., EEG amplitude/frequency, pupil modulation, eye gaze saccades, etc.) from the user 110 via a sensor 35 (e.g., a user facing camera). For example, the device 105 obtains pupillary data 40 (e.g., eye gaze characteristic data). While this example and other examples discussed herein illustrate a single device 105 in a real-world physical environment 100, the techniques disclosed herein are applicable to multiple devices and multiple sensors, as well as to other real-world environments/experiences. For example, the functions of device 105 may be performed by multiple devices.

In some implementations, as illustrated in FIG. 1, the device 105 includes additional sensors, 32 and 34, for obtaining image data of the physical environment. For example, sensors 32 and 34 are on the back of device 105, facing away from the user 110, such that the user would be facing the environment and capturing images and/or depth data of the current environment (e.g., for determining a scene understanding as further discussed herein).

In some implementations, as illustrated in FIG. 1, the device 105 is a handheld electronic device (e.g., a smartphone or a tablet). In some implementations the device 105 is a laptop computer or a desktop computer. In some implementations, the device 105 has a touchpad and, in some implementations, the device 105 has a touch-sensitive display (also known as a "touch screen" or "touch screen display"). In some implementations, the device 105 is a wearable head mounted display (HMD).

In some implementations, the device 105 includes an eye tracking system for detecting eye position and eye movements. For example, an eye tracking system may include one or more infrared (IR) light-emitting diodes (LEDs), an eye tracking camera (e.g., near-IR (NIR) camera), and an illumination source (e.g., an NIR light source) that emits light (e.g., NIR light) towards the eyes of the user 110. Moreover, the illumination source of the device 105 may emit NIR light to illuminate the eyes of the user 110 and the NIR camera may capture images of the eyes of the user 110. In some implementations, images captured by the eye tracking system may be analyzed to detect position and movements of the eyes of the user 110, or to detect other information about the eyes such as pupil dilation or pupil diameter. Moreover, the point of gaze estimated from the eye tracking images may enable gaze-based interaction with content shown on the near-eye display of the device 105. Additional camera's may be included to capture other areas of the user (e.g., an HMD with a jaw cam to view the user's mouth, a down cam to view the body, an eye cam for tissue around the eye, and the like). These cameras and other sensors can detect motion of the body, and/or signals of the face modulated by the breathing of the user (e.g., remote PPG).

In some implementations, the device 105 has a graphical user interface (GUI), one or more processors, memory and one or more modules, programs or sets of instructions stored in the memory for performing multiple functions. In some implementations, the user 110 interacts with the GUI through finger contacts and gestures on the touch-sensitive surface. In some implementations, the functions include image editing, drawing, presenting, word processing, website creating, disk authoring, spreadsheet making, game playing, telephoning, video conferencing, e-mailing, instant messaging, workout support, digital photographing, digital videoing, web browsing, digital music playing, and/or digital video playing. Executable instructions for performing these functions may be included in a computer readable storage medium or other computer program product configured for execution by one or more processors.

In some implementations, the device 105 employs various physiological and/or behavioral sensor, detection, or measurement systems. Detected physiological data may include, but is not limited to, EEG, electrocardiography (ECG), electromyography (EMG), functional near infrared spectroscopy signal (fNIRS), blood pressure, skin conductance, or pupillary response. Detected behavioral data may include, but is not limited to, facial gestures based on image data, voice recognition based on acquired audio signals, etc.

In some implementations, the device 105 maybe communicatively coupled to an additional sensor. For example, sensor 17 (e.g., an EDA sensor) maybe communicatively coupled to device 105 via a wired or wireless connection, and sensor 17 may be located on the skin of the user 110 (e.g., on the arm as illustrated, or placed on the hand/fingers of the user). For example, sensor 17 can be utilized for detecting EDA (e.g., skin conductance), heart rate, or other physiological data that utilizes contact with the skin of a user. Moreover, the device 105 (using one or more sensors) may concurrently detect multiple forms of physiological data in order to benefit from synchronous acquisition of physiological data or behavioral data. Moreover, in some implementations, the physiological data or behavioral data represents involuntary data, e.g., responses that are not under conscious control. For example, a pupillary response may represent an involuntary movement. In some implementations, sensor 17 is placed on the skin as part of a watch device, such as a smart watch.

In some implementations, one or both eyes 45 of the user 110, including one or both pupils 50 of the user 110 present physiological data in the form of a pupillary response (e.g., eye gaze characteristic data 40b). The pupillary response of the user 110 results in a varying of the size or diameter of the pupil 50, via the optic and oculomotor cranial nerve. For example, the pupillary response may include a constriction response (miosis), e.g., a narrowing of the pupil, or a dilation response (mydriasis), e.g., a widening of the pupil. In some implementations, the device 105 may detect patterns of physiological data representing a time-varying pupil diameter. In some implementations, the device 105 may further determine the interpupillary distance (IPD) between a right eye and a left eye of the user.

The user data (e.g., upper facial feature characteristic data, lower facial feature characteristic data, and eye gaze characteristic data, etc.), including information about the position, location, motion, pose, etc., of the head 27 and/or body of the user 110, may vary in time and the device 105 may use the user data to generate and/or provide a representation of the user. In some implementations, the user data includes texture data of the facial features such as eyebrow movement, chin movement, nose movement, cheek movement, etc. For example, when a person (e.g., user 110) smiles (e.g., to detect a positively valenced event), the upper and lower facial features can include a plethora of muscle movements that may be replicated by a representation of the user (e.g., an avatar) based on the captured data from sensors 35.

The physiological data (e.g., eye data, head/body data, etc.) and behavioral data (e.g., voice, facial recognition, etc.) may vary in time and the device 105 may use the physiological data and/or behavioral data to measure a physiological/behavioral response to the visual characteristic 30 (e.g., looking at particular content on the display 15 such as reading text) or the user's intention to interact with content 20. For example, when presented with content 20, which may include an interactive element, by a device 105, the user 110 may select the interactive element without requiring the user 110 to complete a physical button press based on the user's eye movements and gaze behavior associated with eye data, head/body data, etc. In some implementations, the physiological data may include the physiological response to a visual or an auditory stimulus of a radius of the pupil 50 after the user 110 glances at content 20, measured via eye-tracking technology (e.g., via an HMD). In some implementations, the physiological data includes EEG amplitude/frequency data measured via EEG technology, or EMG data measured from EMG sensors or motion sensors.

In some implementations, a pupillary response may be in response to auditory feedback that one or both ears 60 of the user 110 detect (e.g., an audio notification to the user). For example, device 105 may include a speaker 12 that projects sound via sound waves 14. The device 105 may include other audio sources such as a headphone jack for headphones, a wireless connection to an external speaker, and the like.

Figure 2A:
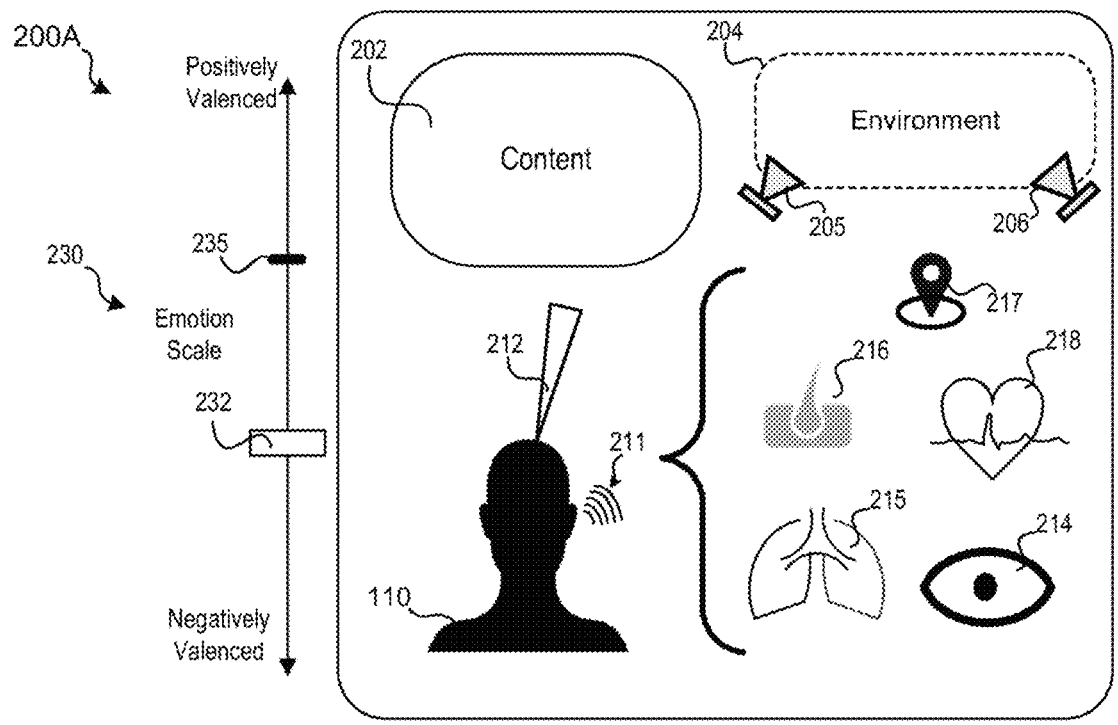
FIGS. 2A and 2B illustrate detecting an emotional state viewing content based on physiological data and behavioral data in accordance with some implementations.
Figure 2B:
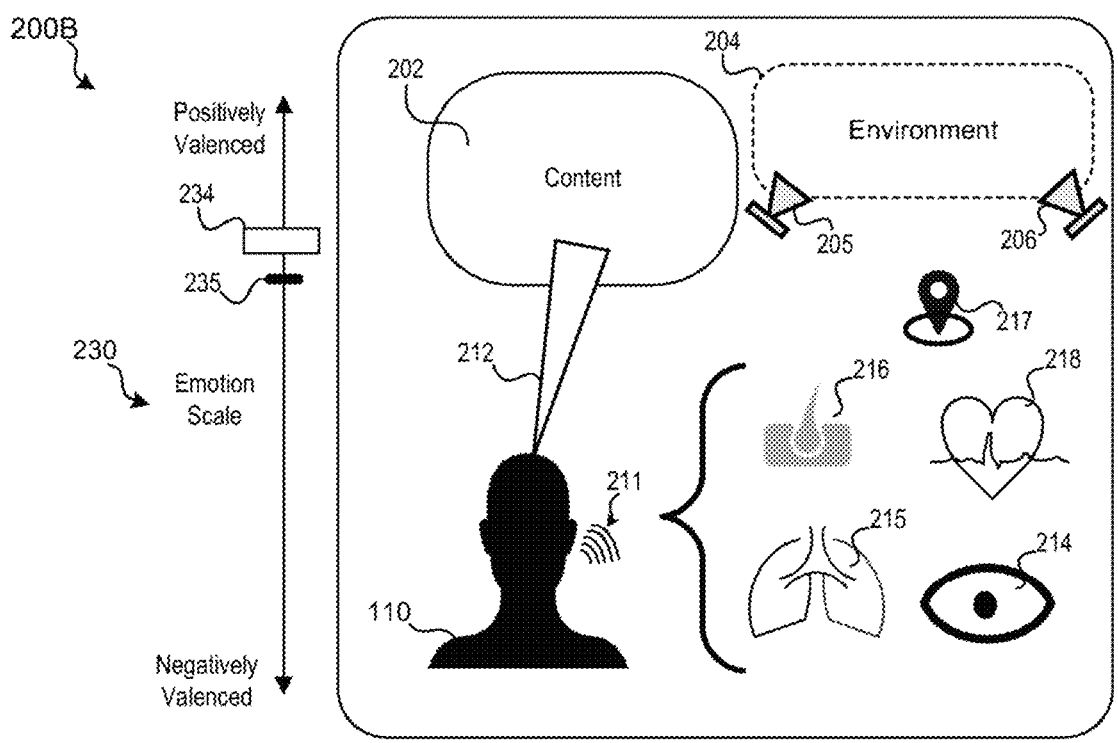

FIG. 2A and FIG. 2B illustrate assessing an emotional state of a user viewing content based on obtained physiological data in accordance with some implementations. In particular, FIGS. 2A and 2B illustrate a user (e.g., user 110 of FIG. 1) being presented with content 202 in an environment 204 during a content presentation (e.g., a meditation experience) at content presentation instant 200A and later in time at content presentation instant 200B, respectively, where the user, via obtained physiological data and/or behavioral data, has a physiological/behavioral response to the content (e.g., the user looks towards portions of the content and/or environment as detected by eye gaze characteristic data 212). For example, a user is being presented with content 202 that includes visual content (e.g., an XR experience or pass through video of a physical environment at a live event, such as at a birthday party), and the user's physiological/behavioral data such as voice data 211, eye gaze characteristic data 212, pupillary data 214, respiratory data 215, EDA data 216, and heart rate data 218 are continuously (or periodically) monitored. The physiological/behavioral data may initially be obtained to determine a user's baseline data, then during an experience, the physiological data or behavioral data can be monitored and compared to the determined baseline to assess an emotional state via the emotion scale 230. In some implementations, location data 217 of the current location of the device and/or the user may be obtained (e.g., GPS data or the like) to track the user's position within the physical environment. Additionally, image data and/or depth data of the environment 204 is obtained using sensors 205 and 206 (e.g., sensors 32 and 34 of device 105 in FIG. 1).

In the particular examples of FIGS. 2A and 2B, at content presentation instant 200A, the user's eye gaze characteristic is not as engaged or focused on the content 202 (e.g., not in a particular high positively valenced state), such that the emotion scale 230 shows the sliding bar indicator 232 as close to the middle and more towards the "negatively valenced" portion of the emotion scale 230. Then, at content presentation instant 200B of FIG. 2B (e.g., during a more highly positively valenced moment such as blowing out candles on a cake), the user's eye gaze characteristic 212 appears to be more engaged/focused on the content 202, such that the emotion scale 230 shows the sliding bar indicator 234 as higher towards the "positively valenced" portion then at content presentation instant 200A. In some implementations, techniques described herein utilize a trigger to record the content 202 and/or a view of the user of the environment 204 when the emotion scale 230 identifies positively valenced events. For example, a positively valenced recording threshold 235 may be used to trigger a recording for a period of time associated content presentation instant 200B, where the bar indicator 234 indicates a highly positive emotional state of the user above the positively valenced recording threshold 235. In some implementations, the recording of the content/environment would cease when the bar indicator 234 indicates an emotional state at or below the positively valenced recording threshold 235. Additionally, or alternatively, in some implementations, the recording of the content/environment may stop based on a predetermined time limit.

In some implementations, a respiratory state may be determined based on the acquired respiratory data 215 from a respiratory sensor (e.g., a sensor worn on the user). An increased respiratory rate may indicate that the user is excited, thus a high positively valenced emotion associated with a potential high positively valenced moment/event that may be recorded. Additionally, or alternatively, respiratory data 215 may involve sensor fusion of different acquired data from device 105, without using an additional respiratory sensor. For example, the different acquired data that may be fused may include head pose data from an IMU, audio from a microphone, camera images of the user's face and/or body (e.g., an HMD with a jaw cam, down cam to view the body, eye cam for tissue around the eye, and the like), motion of the body, and/or signal of the face modulated by the breath (e.g., remote PPG). Using this type of sensor fusion to track the breathing of the user, such as while wearing an HMD, may negate the need for a user to wear a sensor worn around the user's diaphragm, for example, to track his or her respiratory rates.

In some implementations, determining when to record a positively valenced moment/event may be based on context data. For example, the content 202 may be analyzed by a context analysis instruction set to determine context data for the experience of the user (e.g., the experience of being present in the current physical environment while watching video content on an electronic device such as an HMD). Determining context data of the experience may involve using computer vision to generate a scene understanding of the visual and/or auditory attributes of the physical environment (e.g., environment 204), such as where is the user, what is the user doing, what objects are nearby. Additionally, or alternatively, determining context data of the experience may involve determining a scene understanding of the visual and/or auditory attributes of the content presentation (e.g., content 202, such as a video). For example, content 202 and environment 204 may include one or more people, objects, or other background objects that are within view of the user that may be detected by an objection detection algorithm, face detection algorithm, or the like.

Figure 3:
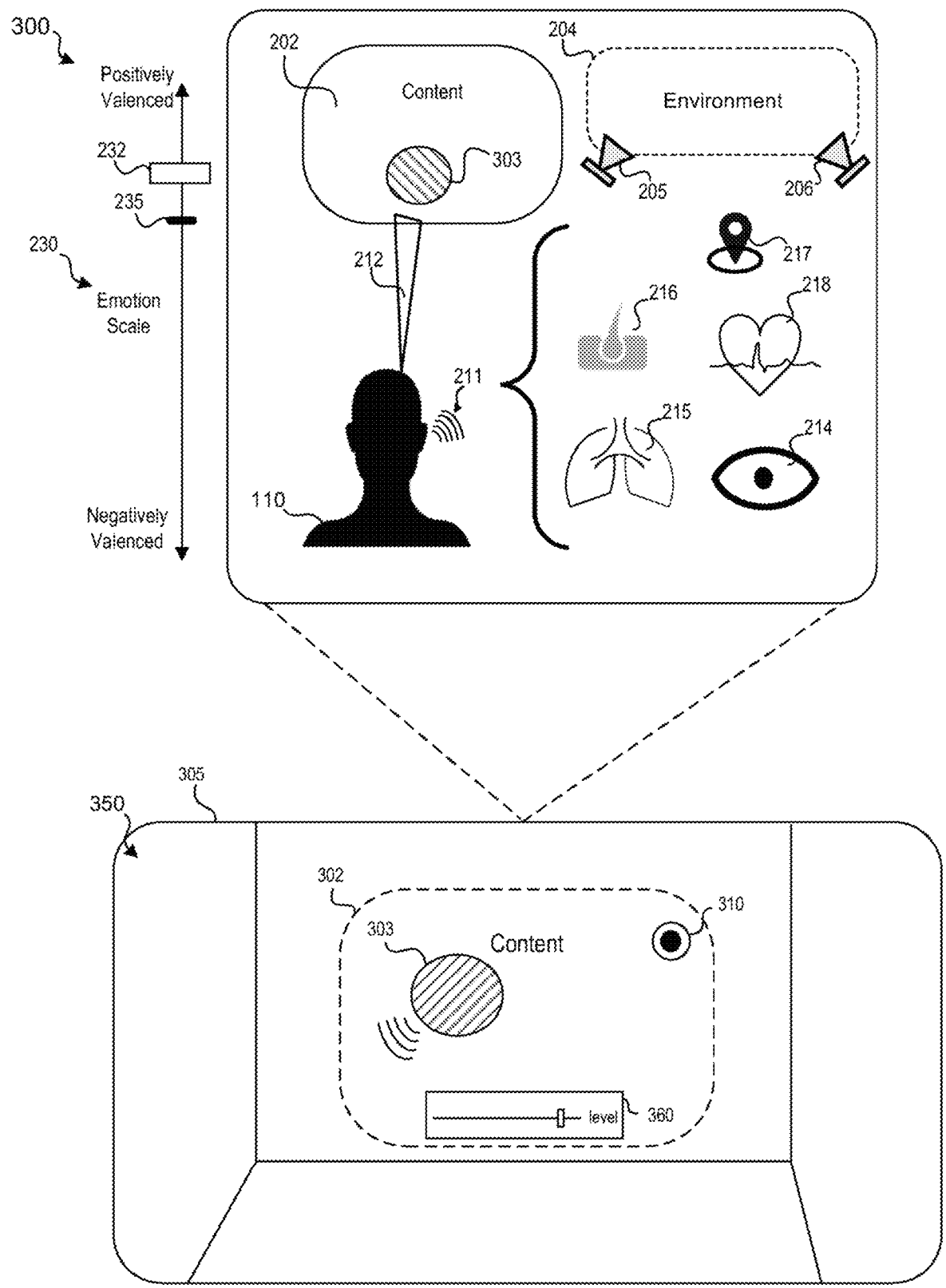
FIG. 3 illustrates a recording of an event occurring in an environment based on an emotional state and a scene understanding of the environment in accordance with some implementations.

FIG. 3 illustrates assessing emotional states based on physiological data and/or behavioral signals of a user viewing content and modifying the content based on obtained physiological data, in accordance with some implementations. The user 110 is being presented with content 202 at content presentation instant 300 (e.g., after content presentation instant 200B) that includes visual content (e.g., virtual content), and the user's physiological data such as voice data 211, eye gaze characteristic data 212, pupillary data 214, respiratory data 215, EDA data 216, and heart rate data 218 are continuously or periodically monitored. Additionally, location data 217, and image and/or depth data from sensors 205 and 205 may also be continuously or periodically monitored. In particular, FIG. 3 illustrates a user 110 being presented with content 202 in an environment 204 during a content presentation (e.g., a birthday party) at content presentation instant 300 where the user 110, via obtained physiological data, has a physiological response to the content. For example, the user 110 looks towards portions of the content, in particular the content enhancement 303, as detected by eye gaze characteristic data 212, where the content is modified based on that response. For example, after content presentation instant 200A, where the user was determined to have a lower positively valenced emotion, a content enhancement 303 may be applied to the content 202 (e.g., to cheer up user 110 who may be experiencing a negatively valenced emotion). For example, content enhancement 303 may include a video of a previously recorded highly positive valenced event, or virtual content to cheer up the user 110, and the like. Thus, after a segment of time after the user's physiological data is analyzed (e.g., by a physiological data instruction set) and the context data of the content 202 and/or environment 204 is analyzed (e.g., by a context instruction set), content presentation instant 300 is presented to the user with a content enhancement 303 because the emotional state assessment was that the user may have exhibited an undesired emotional state (e.g., stress, despair, sadness, etc.). FIG. 3 further illustrates the user is exhibiting more positively valenced emotions based on the emotion scale 230, where the sliding bar indicator 232 is higher on the scale than at content presentation instant 200A when the user was exhibiting more negatively valenced emotions.

FIG. 3 further illustrates an exemplary view 350 of a physical environment (e.g., real-world environment 100 of FIG. 1) provided by electronic device 305 (e.g., device 105). The view 350 may be a live camera view of the physical environment, a view of the physical environment through a see-through display, or a view generated based on a 3D model corresponding to the physical environment. The view 350 includes an application window presented on the device of content 302 (e.g., a representation of content 202). The presentation of content 302 includes the content enhancement 303 (e.g., an audio and/or visual content such as a video or a notification). Additionally, view 350 includes a visual recording indicator 310 that provides the user an indication of that a recording of the current view of the content 302 (e.g., a representation of content 202) and/or a current view of the environment 204 may be concurrently captured using one or more sensors of the device 305 based on the current measured emotional state. For example, a positively valenced recording threshold 235 may be used to trigger the recording for a period of time associated content presentation instant 300. Alternatively, other visual or audio indicators may be used to indicate to the user that a recording of the current view is currently being captured.

For example, a user is exhibiting a low emotional state while at work, the content enhancement 303 may indicate the low respiratory state to the user (e.g., an audio and/or visual notification) and may provide the user with some alternative actions for calming down or cheering up (e.g., meditation music, a relaxing XR environment, a viewing of previously recorded event/memory, etc.). As illustrated, the emotional state scale 230 provides a possible use case of comparing the detected level of emotion of the user and the performance level associated with an emotional state. For example, for the above example of exhibiting a less than desirable emotional state (e.g., despair, sadness, etc.), then the content enhancement 303 could alert the user of the emotional state and try to increase his or her exhibited emotional responses. Additionally, the user's emotional state assessment can be continuously monitored throughout the presentation of the content 302.

The content enhancement 303 may include a visual presentation. For example, an icon may appear, or a text box may appear instructing the user of the current emotional state. In some implementations, the content enhancement 303 may include an auditory stimulus. For example, spatialized audio may be presented to redirect the user's attention towards the particular areas of the content presentation (e.g., if determined the user was exhibiting low emotional levels, could steer the user's attention towards something cheerful within the content).

In some implementations, the content enhancement 303 may include an entire display of visual content (e.g., a cheerful video over the entire display of the device). The content (and/or content enhancement 303) may include or provide a view of a 3D environment. Alternatively, the content enhancement 303 may include visual content around the frame of the display of the device (e.g., on a mobile device, a virtual frame of the display be created to acquire the user's attention from a particular emotional state). In some implementations, the content enhancement 303 may include a combination of visual content (e.g., a notification window, an icon, or other visual content described herein) and/or an auditory stimulus. For example, a notification window or arrow may direct the user to a particular content area and an audio signal may be presented that directs the user. These visual and/or auditory cues can help direct the user to particular content enhancements that can aid the user in coping with different emotional states to increase his or her performance levels (for a work experience), or simply for comfortable viewing of the content 302 (e.g., providing meditation if determined the user is in a stressful environment or situation).

In some implementations, as illustrated in FIG. 3, the view 350 may further include an interactive indicator 360. The interactive indicator 360 may allow the user 110 to control a level of immersion of the view 350. For example, a level of immersion may be changed that changes the percentage of blurring between a view of the real physical world and a virtual world during an XR experience (e.g., during meditation). For example, the higher the level of immersion the more virtual content the user 110 would view, and less to none of the physical environment would be visible. Alternatively, a lower level of immersion, the less virtual content would be shown, and almost an unobstructed view of the physical environment would be displayed in view 350 (such as pass-through video while wearing an HMD). Additionally, or alternatively, the interactive indicator 360 may allow a user to view and/or control other aspects of the view 350, such as controlling the level of lighting, adding a virtual content such as weather, and the like.

Figure 4:
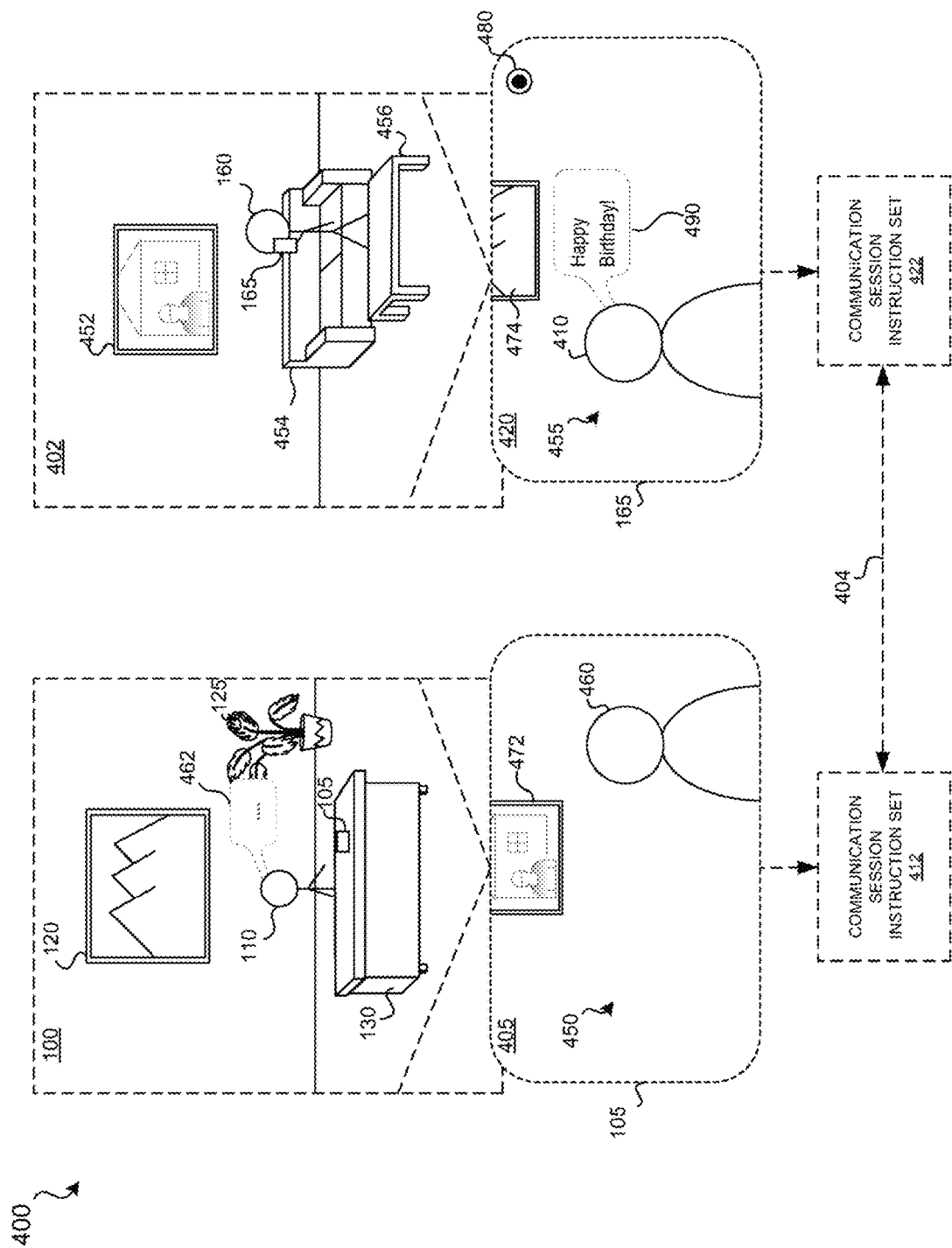
FIG. 4 illustrates exemplary electronic devices operating in different physical environments during a communication session with a view for a second device of a second user that includes a consent approval for a user representation of the second user for a view for a first user in accordance with some implementations.

FIG. 4 illustrates exemplary electronic devices operating in different physical environments during a communication session with a view for a second device of a second user that includes a recording element of the experience in accordance with some implementations. For this example, to demonstrate a highly positive valenced emotion, the user 110 is a famous celebrity who is calling user 160 to wish him or her a happy birthday (e.g., a celebrity video call). Additionally, assuming that privacy permissions were granted to record this celebrity call, FIG. 4 illustrates an automatic recording of the highly positive valenced event based on the detected emotional state (e.g., a fan receiving a call from a favorite celebrity).

In particular, FIG. 4 illustrates exemplary operating environment 400 of electronic devices 105, 165 operating in different physical environments 100, 402, respectively, during a communication session, e.g., while the electronic devices 105, 165 are sharing information with one another or an intermediary device such as a communication session server. In this example of FIG. 4, the physical environment 100 is a room that includes a wall hanging 120, a plant 125, and a desk 130. The electronic device 105 includes one or more cameras, microphones, depth sensors, or other sensors that can be used to capture information about and evaluate the physical environment 100 and the objects within it, as well as information about the user 110 of the electronic device 105. The information about the physical environment 100 and/or user 110 may be used to provide visual content (e.g., for user representations) and audio content (e.g., for text transcription) during the communication session. For example, a communication session may provide views to one or more participants (e.g., users 110, 160) of a 3D environment that is generated based on camera images and/or depth camera images of the physical environment 100, a representation of user 110 based on camera images and/or depth camera images of the user 110, and/or text transcription of audio spoken by a user (e.g., a transcription bubble). As illustrated in FIG. 4, user 110 (e.g., a celebrity in this example) is speaking to user 160 as shown by spoken words 462.

In this example, the physical environment 402 is a room that includes a wall hanging 452, a sofa 454, and a coffee table 456. The electronic device 165 includes one or more cameras, microphones, depth sensors, or other sensors that can be used to capture information about and evaluate the physical environment 402 and the objects within it, as well as information about the user 160 of the electronic device 165. The information about the physical environment 402 and/or user 160 may be used to provide visual and audio content during the communication session. For example, a communication session may provide views of a 3D environment that is generated based on camera images and/or depth camera images (from electronic device 105) of the physical environment 100 as well as a representation of user 160 based on camera images and/or depth camera images (from electronic device 165) of the user 160. For example, a 3D environment may be sent by the device 105 by a communication session instruction set 412 in communication with the device 165 by a communication session instruction set 422 (e.g., via network connection 404).

As illustrated in FIG. 4, the audio spoken by user 110 (e.g., spoken words 462) is transcribed (e.g., via communication instruction set 422) at device 165 (or via remote server), and the view 420 provides user 160 with a text transcription of audio spoken by the speaker (user 110) via the transcription bubble 490 (e.g., "Happy Birthday!"). Additionally, based on the determined emotional state 160 and/or the scene understanding of the environment (e.g., a communication session with a celebrity in the environment 455), the view 420 further provides a recording element 480 that indicates to the user the current session is being recorded automatically (e.g., the positively valenced emotional state has triggered a threshold to initiate a recording of the current experience, provided there is consent to view and record the user representations of each user during a particular communication session). For example, as illustrated in FIG. 4, the electronic device 105 within physical environment 100 provides a view 405 of a 3D environment 450 that enables user 110 to view a representation 460 (e.g., an avatar) of at least a portion of the user 110 (e.g., from mid-torso up) and representation 472 of the wall hanging 452 within a 3D environment 450. Additionally, for example, as illustrated in FIG. 4, the electronic device 165 within physical environment 402 provides a view 420 of a 3D environment 455 that enables user 160 to view a representation 410 (e.g., an avatar) of at least a portion of the user 110 (e.g., from mid-torso up), a representation 474 of the wall hanging 120, and a recording element 480 within the 3D environment 455, including a transcription of the words spoken by the user 110 via the transcription bubble 490 (e.g., "Happy Birthday!").

Figure 5B:
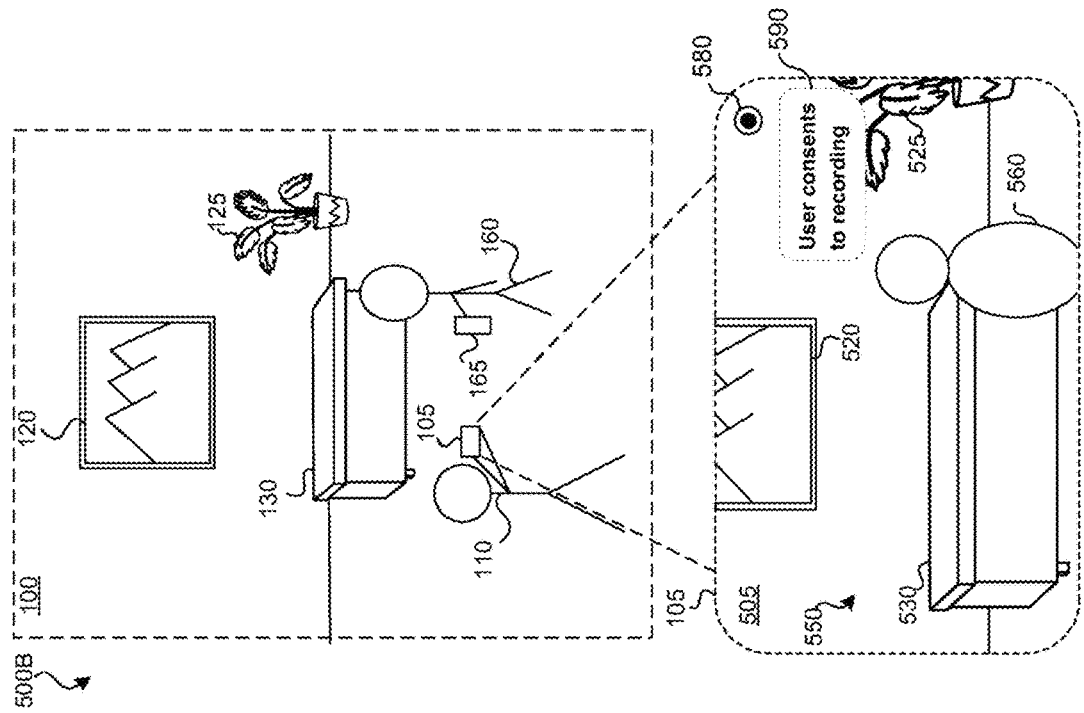
FIGS. 5A and 5B illustrate exemplary electronic devices operating in the same physical environment during a communication session with a view for a device that includes a consent approval for recording an event in accordance with some implementations.
Figure 5A:
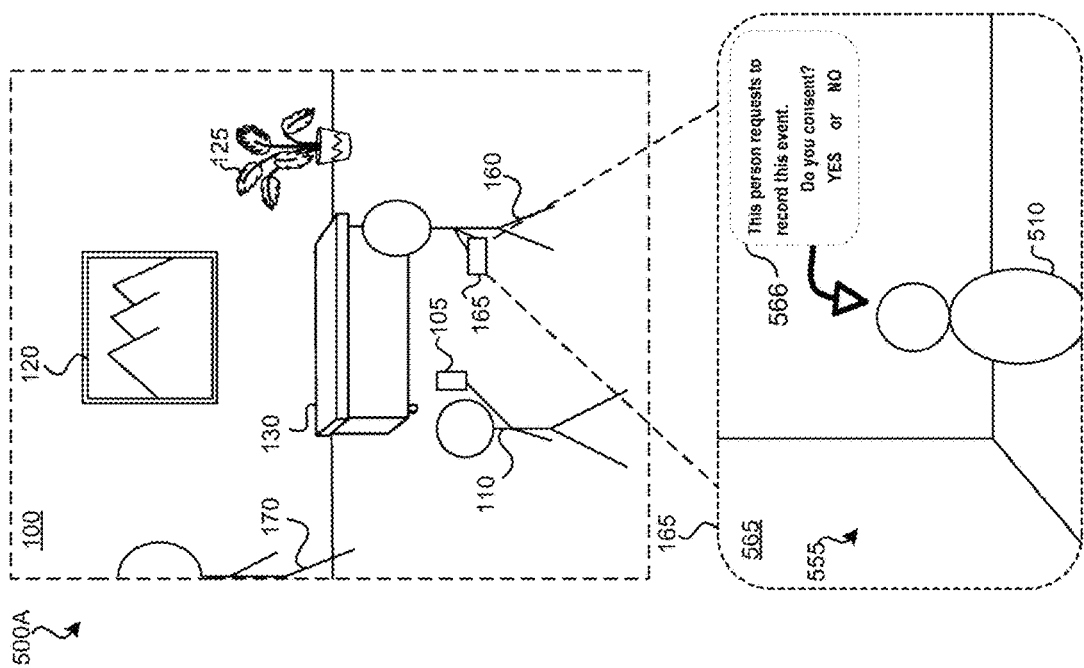

FIG. 5A illustrates exemplary electronic devices operating in the same physical environment during a communication session with a view for a second device of a second user that includes a consent approval for a user representation of the second user for a view for the first user of FIG. 5A in accordance with some implementations. In particular, FIG. 5A illustrates an exemplary operating environment 500A of an exemplary view 565 of an electronic device 165 during a communication session with user 110 using device 105, where the view 565 is of a 3D environment 555 that is a representation of the physical environment 100. In particular, operating environment 500A illustrates a text transcription of a consent request (e.g., transcription bubble 566) for permission to allow a recording of the event and/or of user 160 during a communication session. In this example, during the communication session, the electronic device 165 provides a view 565 that enables user 160 to view a representation 510 of at least a portion of user 110 within the 3D environment 555 (e.g., an XR environment) from the communication session (e.g., the user 160 sees an avatar of the other user 110, may see live video of the other user 110 via pass through video, or may see a direct view of the other user 110 through a transparent or translucent display). For example, the user 160 views the representation of the other user 110 and a representation of the physical environment 100 of user 110 from his or her perspective (e.g., the back of the room of physical environment 100).

Additionally, the view 565 includes an interactable notification bubble 566 that provides a consent request from user 110 to record the event and/or to record the user 160. As discussed herein, consent may be automatically provided based on privacy settings. For example, device 105 may be able to detect from device 165 (or vice versa), during a communication session, that the user 160 has a privacy setting that allows user 110 to automatically record the event that may include the other user or a representation of the user (e.g., an avatar). Additionally, or alternatively, consent may be provided by some form of approval/engagement with the viewer as discussed herein. For example, the user 110 may verbally request from user 160 if they consent. If the verbal request is approved, the system may use that verbal consent to proceed and allow user 110 to record.

FIG. 5B illustrates exemplary electronic devices operating in the same physical environment during a communication session with a view for the first device of the first user that includes a user representation of the second user that the second user consented to in FIG. 5A in accordance with some implementations. In particular, FIG. 5B illustrates an exemplary environment 500B of an exemplary view 505 of a physical environment 100 provided by an electronic device 105 during a communication session with user 160 using device 165. The view 505 is of a 3D environment 550 that is based on the physical environment 100 and added elements, such as a user representation 560 of user 160 (e.g., an avatar of user 160). FIG. 5A illustrates that there is consent to record the current event that may include the other user. The view 505 includes a notification bubble 590 that provides an indication that consent is approved to record. Additionally, view 505 includes a recording element 580 that indicates whether the current view 505 is being recorded. For example, notification bubble 590 provides user 110 (via device 105) with the indication text: "User consents to recording" during a live communication session. As discussed herein, consent may be provided based on privacy settings from the speaker, by some type of approval/engagement with the other user, or obtained from user preference settings from a user information system.

Figure 6:
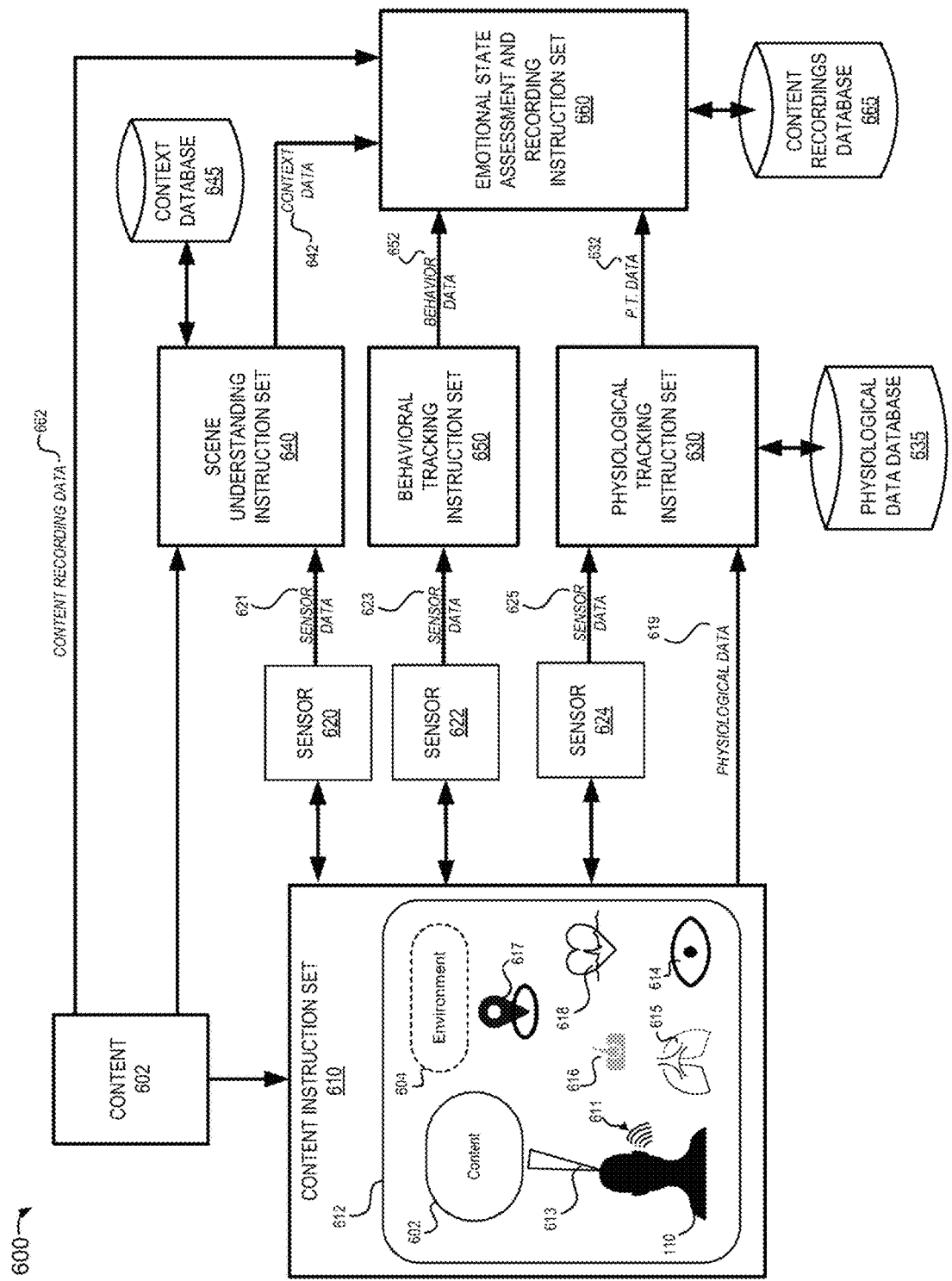
FIG. 6 illustrates a system diagram for recording an event based on assessing a scene understanding of an environment and assessing an emotional state based on physiological and behavioral data in accordance with some implementations.

FIG. 6 is a system flow diagram of an example environment 600 in which a system can determine to record an event based on assessing a scene understanding of an environment and assessing an emotional state based on physiological and behavioral data according to some implementations. In some implementations, the system flow of the example environment 600 is performed on a device (e.g., device 105 of FIG. 1), such as a mobile device, desktop, laptop, or server device. The content of the example environment 600 can be displayed on a device (e.g., device 105 of FIG. 1) that has a screen (e.g., display 15) for displaying images and/or a screen for viewing stereoscopic images such as an HMD. In some implementations, the system flow of the example environment 600 is performed on processing logic, including hardware, firmware, software, or a combination thereof. In some implementations, the system flow of the example environment 600 is performed on a processor executing code stored in a non-transitory computer-readable medium (e.g., a memory).

The system flow of the example environment 600 acquires and presents content (e.g., video content, a series of image data, or a view of a representation of the environment, such as pass through video) to a user during an experience (e.g., at a birthday party), obtains physiological data associated with the user during the presentation of the content, assesses an emotional state (e.g., emotional state, respiratory state, cognitive state, etc.) based on physiological data, location data, image data, and the like, of the user, and determines whether to record an event based on the data. In some implementations, the example environment 600 also analyzes the content and/or the environment for context data, and determines to record the event based on the emotional state and the context data. For example, an emotional state assessment technique described herein determines whether to record an event based on obtained physiological data and/or behavioral data and a scene understanding.

The example environment 600 includes a content instruction set 610 that is configured with instructions executable by a processor to provide and/or track content 602 for presentation on a device (e.g., device 105 of FIG. 1). For example, the content instruction set 610 provides content presentation instant 612 that includes content 602 to a user 110 while user is within a physical environment 604 (e.g., a room, outside, etc.). For example, content 602 may include background image(s) and sound data (e.g., a video). The content presentation instant 612 could be an XR experience that includes some virtual content and some images of a physical environment. Alternatively, the user could be wearing an HMD and is looking at a real physical environment either via a live camera view, or the HMD allows a user to look through the display, such as wearing smart glasses that a user can see through, but still be presented visual and/or audio cues. During an experience, while a user 110 is viewing the content 602, tracking of the user's respiratory rate (e.g., respiratory data 615) and pupillary data 614 (e.g., pupillary data 40 such as eye gaze characteristic data 613) and sent as physiological data 619. Additionally, other physiological data can be monitored and sent as physiological data 619, such as EDA data 616 and heart rate data 618. Additionally, behavioral data may be monitored by one or more sensors (e.g., sensor 620, 622, 624, etc.), such as voice data 611, or images of the face of the user for facial recognition, and the like. Moreover, other data can be monitored such as location data 617 and image and/or depth data sent as sensor data 621 to the scene understanding instruction set 640.

The environment 600 further includes a physiological tracking instruction set 630 to track a user's physiological attributes as physiological tracking data 632 using one or more of the techniques discussed herein or as otherwise may be appropriate. For example, the physiological tracking instruction set 630 may acquire physiological data 619 (e.g., pupillary data 614 and respiratory data 615) from the user 110 viewing the content 602. Additionally, or alternatively, a user 110 may be wearing a sensor 624 (e.g., sensor 17 of FIG. 1, such as an EEG sensor, an EDA sensor, heart rate sensor, etc.) that generates sensor data 625 (e.g., EEG data, respiratory data 615, EDA data 616, heart rate data 618, etc.) as additional physiological data. Thus, as the content 602 is presented to the user as content presentation instant 612, the physiological data 619 (e.g., pupillary data 614 and respiratory data 615) and/or sensor data 625 is sent to the physiological tracking instruction set 630 to track a user's physiological attributes as physiological tracking data 632, using one or more of the techniques discussed herein or as otherwise may be appropriate. Alternatively, the physiological tracking instruction set 630 obtains physiological data associated with the user 110 from a physiological database 635 (e.g., if the physiological data 619 was previously analyzed by the physiological tracking instruction set 630, such as during a previously viewed/analyzed video).

The environment 600 further includes a behavioral tracking instruction set 650 to track a user's behavioral attributes as behavioral data 652 using one or more of the techniques discussed herein or as otherwise may be appropriate. For example, the behavioral tracking instruction set 650 may acquire sensor data 623 (e.g., voice data 611, image data, etc.) from the user 110 viewing the content 602. Thus, as the content 602 is presented to the user as content presentation instant 612, sensor data 623 is sent to the behavioral tracking instruction set 650 to track a user's behavioral attributes as behavioral data 652, using one or more of the techniques discussed herein or as otherwise may be appropriate. Alternatively, the behavioral tracking instruction set 650 may obtain behavioral data associated with the user 110 from a behavioral database (e.g., previously analyzed behavioral data, such as during a previously viewed/analyzed video).

In an example implementation, the environment 600 further includes a scene understanding instruction set 640 that is configured with instructions executable by a processor to obtain the experience data presented to the user (e.g., content 602) and other sensor data (e.g., image data of the environment 604, the user's 25 face and/or eye's, etc.), and generate a scene understanding as context data 642 (e.g., identifying people, objects, etc. of the content 602 and the environment 604). For example, the scene understanding instruction set 640 acquires content 602 and sensor data 621 (e.g., image data) from the sensor 620 (e.g., an RGB camera, a depth camera, etc.) and determines context data 642 based on identifying areas of the content while the user is viewing the presentation of the content 602 (e.g., a first time viewed content/video). Sensors 620, 622, and 624 are illustrated as separate blocks (sensors), however, in some implementations, sensor 620, sensor 622, and sensor 624 are the same sensor.

Alternatively, the scene understanding instruction set 640 selects context data associated with content 602 from a context database 645 (e.g., if the content 602 was previously analyzed by the context instruction set, such as during a previously viewed/analyzed video). In some implementations, the scene understanding instruction set 640 generates a scene understanding associated with content 602 and/or environment 604 as the context data 642. For example, the scene understanding can be utilized to track the overall context of what the user may be focused on during the presentation of content 602, or where the user is, what the user is doing, what physical objects or people are in the vicinity of the user with respect to the environment 604.

In an example implementation, the environment 600 further includes an emotional state assessment and recording instruction set 660 that is configured with instructions executable by a processor to assess the physiological tracking data 632, the context data 642, and the behavioral data 652, using one or more of the techniques discussed herein or as otherwise may be appropriate. For example, an emotional state may be assessed by determining where the user's emotional state may be with respect to an indicator, such as the emotion scale 230 of FIGS. 2 and 3. In particular, the emotional state assessment and recording instruction set 660 acquires physiological tracking data 632 from the physiological tracking instruction set 630, behavioral data 652 from the physiological tracking instruction set 650, and context data 642 from the scene understanding instruction set 640 (e.g., scene understanding data) and determines the emotional state during the presentation of the content 602 and based on attributes of the physical environment 604 that the user is watching the content 602. For example, the context data 642 may provide a scene analysis that can be used by the emotional state assessment and recording instruction set 660 to understand what the person is looking at, where they are at, etc., and determine whether to record an event based on whether the user is exhibiting a highly positive emotional state (e.g., elated, happy, euphoric, excited, etc.). In some implementations, the emotional state assessment and recording instruction set 660 can obtain content recording data 662 (e.g., a particular set of content 602 to record) from the content instruction set 610.

In some implementations, the emotional state assessment and recording instruction set 660 can store the content recording data 662 in the content recordings database 665. For example, if the user is determined to be exhibiting a negatively valenced emotional state or an undesired emotional state (e.g., stress, despair, sadness, etc.), techniques described herein can access a previously recorded event from the content recordings database 665 to display to the user to hopefully alter the user's current emotional state to a more positively valenced emotional state (e.g., to cheer up or calm down a user 110 who may be experiencing a negatively valenced emotion). In some implementations, content enhancement data could be utilized by the content instruction set 610 to present an audio and/or visual feedback cue or mechanism to the user 110 to relax and focus on breathing during the high-level stress situation (e.g., overanxious about an upcoming test). In an educational experience, the feedback cue to the user could be a gentle reminder (e.g., a soothing or calming visual and/or audio alarm) to get back on task of studying, based on an assessment that the user 110 is mind wandering because the user 110 was bored (e.g., a low-level attention indication).

In some implementations, location tracking may be utilized to obtain location data 617 to determine a 3D coordinate of a device as the user may be moving throughout environment 304. For example, a location tracking instruction set may analyzes RGB images from a light intensity camera with a sparse depth map from a depth camera (e.g., time-of-flight sensor), plane extraction data (e.g., plane estimation parameters), and other sources of physical environment information (e.g., camera positioning information such as VIO data, or a camera's SLAM system, GPS data, or the like) to generate location data by tracking device location information for scene understanding algorithms.

Figure 7:
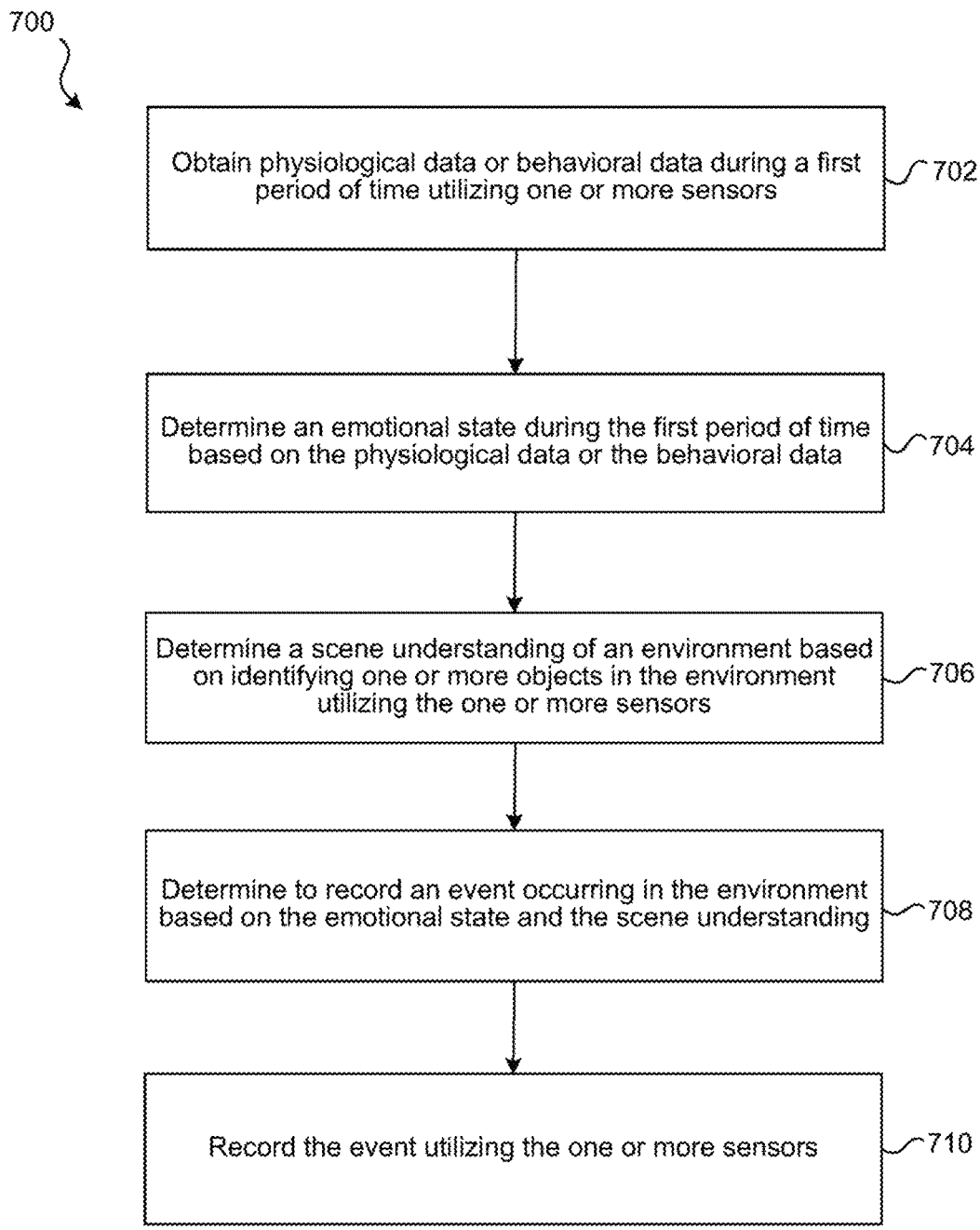
FIG. 7 is a flowchart representation of a method for determining to record an event occurring in an environment based on an emotional state and a scene understanding of the environment in accordance with some implementations.

FIG. 7 is a flowchart illustrating an exemplary method 700. In some implementations, a device such as device 105 (FIG. 1) performs the techniques of method 700 to determine to record an event based on determining an emotional state and a scene understanding of an environment. In some implementations, the techniques of method 700 are performed on a mobile device, desktop, laptop, HMD, or server device. In some implementations, the method 700 is performed on processing logic, including hardware, firmware, software, or a combination thereof. In some implementations, the method 700 is performed on a processor executing code stored in a non-transitory computer-readable medium (e.g., a memory).

At block 702, the method 700 obtains physiological data or behavioral data during a first period of time utilizing the one or more sensors. In some implementations, the physiological data may include EEG amplitude/frequency, image data of the user's face, pupil modulation, eye gaze saccades, EDA, heart rate, and the like. For example, obtaining the physiological data may involve obtaining images of the eye or EOG data from which gaze direction/movement can be determined, electrodermal activity/skin conductance, heart rate, via sensors on a watch (e.g., sensor 17). In some implementations, the behavioral data may include behavioral signals such as facial gestures based on image data (e.g., via internal facing cameras on an HMD), voice recognition based on acquired audio signals, and the like. Additionally, facial recognition may be included as behavioral data (e.g., reconstruction of the user's face based on obtained image data such internal facing camera's on the device, such as an HMD, or image date obtained from another source).

In some implementations, the physiological data and/or behavioral data may be based on hand gesture data associated with detected hand or body movements based on image analysis or an input device such as a watch or other sensor data. For example, a user may be determined to have a positively valenced emotional state based on the actions of a user (e.g., a user jumping up and down in an excited state).

At block 704, the method 700 determines an emotional state during the first period of time based on the physiological data or the behavioral data. The emotional state may include a high positively valenced state such as elated, happy, euphoric, excited, and the like, or a negatively valenced emotions such as sad, depressed, despair, etc. Additionally, or alternatively, the emotional state may include an attention state, a cognitive state, or another physiological or behavioral state. The one or more sensors (e.g., physiological sensors, behavioral sensors, etc.) may include sensors on a device worn by the user (e.g., sensor 17 of FIG. 1, such as an EDA sensor on the back of a watch). The obtained physiological data or behavioral data may include measuring gaze (such as eye gaze stability) because, in the context of tracking emotional states, a high positively valenced emotional state tends to result in greater eye movement. Additionally, the obtained physiological data may include overall body stability data.

In some implementations, emotional state may include a motion state (e.g., a stationary state, a moving state, etc.). For example, sitting or being stationary could identify a negative of neutrally valenced emotional state, while being more active such walking and/or standing could identify a higher positively valenced emotional state.

In some implementations, a machine learning model may be used to determine the emotional state based on physiological data, and audio/visual content of the experience and/or the environment. For example, one or more physiological characteristics may be determined, aggregated, and used to classify the emotional state using statistical or machine learning techniques. In some implementations, the response may be compared with the user's own prior physiological responses or typical user physiological responses to similar content of a similar experience and/or similar environment attributes.

In some implementations, obtaining the physiological data associated with a physiological response of the user includes monitoring for a response or lack of response occurring within a predetermined time following the presenting of the content or a user performing a task. For example, the system may wait for up to five seconds after an event within the video to see if a user looks in a particular direction (e.g., a physiological response).

In some implementations, obtaining physiological data (e.g., pupillary data 40) is associated with a gaze of a user that may involve obtaining images of the eye or electrooculography signal (EOG) data from which gaze direction and/or movement can be determined. In some implementations, the physiological data includes at least one of skin temperature, respiration, photoplethysmogram (PPG), electrodermal activity (EDA), eye gaze tracking, and pupillary movement that is associated with the user.

Some implementations obtain physiological data and other user information to help improve a user experience. In such processes, user preferences and privacy should be respected, as examples, by ensuring the user understands and consents to the use of user data, understands what types of user data are used, has control over the collection and use of user data and limiting distribution of user data, for example, by ensuring that user data is processed locally on the user's device. Users should have the option to opt in or out with respect to whether their user data is obtained or used or to otherwise turn on and off any features that obtain or use user information. Moreover, each user will have the ability to access and otherwise find out anything that the system has collected or determined about him or her. User data is stored securely on the user's device. User data that is used as input to a machine learning model is stored securely on the user's device, for example, to ensure the user's privacy. The user's device may have a secure storage area, e.g., a secure enclave, for securing certain user information, e.g., data from image and other sensors that is used for face identification, face identification, or biometric identification. The user data associated with the user's body and/or emotional state may be stored in such a secure enclave, restricting access to the user data and restricting transmission of the user data to other devices to ensure that the user data is kept securely on the user's device. User data may be prohibited from leaving the user's device and may be used only in machine learning models and other processes on the user's device.

In some implementations, the emotional state may be determined based on using the physiological data to determine head pose, sounds, jaw movement, cheek movement, nose movement, movement of tissue surrounding an eye, or a signal of a face modulated by breath (e.g., PPG). For example, a determined respiratory rate may be approximately 7 breaths per minute. In some implementations, determining a respiratory rate may involve sensor fusion of different acquired data without using an additional respiratory sensor. For example, the different acquired data that may be fused may include head pose data from an IMU, audio from a microphone, camera images of the user's face and/or body (e.g., an HMD with a jaw cam, down cam, eye cam for tissue around the eye, and the like), motion of the body, and/or signal of the face modulated by the breath (e.g., remote PPG). Using this type of sensor fusion to track the breathing of the user, such as while wearing an HMD, may negate the need for a user to wear a sensor worn around the user's diaphragm, for example, to track his or her respiratory rates.

In some implementations, an emotional state may be determined based on the obtained physiological data and the context of the experience. In some implementations, determining to record the event occurring in the environment is based on using a machine learning classifier model, where the physiological data or the behavioral data are input into the machine learning classification model to identify one or more emotional events (e.g., positive or negative events). Machine learning algorithms can be utilized to decode an emotional state from sensor data and initiate recording automatically, if the experience is identified as a memorable event. For example, a machine learning model may be used to determine the emotional state based on eye tracking and other physiological data, behavioral data, and audio/visual content of the experience and/or the environment (e.g., a scene understanding). For example, one or more physiological or behavioral characteristics may be determined, aggregated, and used to classify the emotional state using statistical or machine learning techniques. In some implementations, the response may be compared with the user's own prior responses or typical user responses to similar content of a similar experience and/or similar environment attributes.

In some implementations, the emotional state is determined based on using the physiological data to measure gaze or body stability. In some implementations, the emotional state is determined based on determining a level of emotion (e.g., a Differential Emotions Scale (DES), a Levels of Emotional Awareness Scale (LEAS), and the like). In some implementations, the emotional state is determined based on the respiratory state (e.g., a particular range of a respiratory rate may indicate the user is focused on a task).

In some implementations, determining that the user has a particular threshold of attention (e.g., high, low, etc.) includes determining a level of attention as a sliding scale. For example, the system could determine a level of attention as an attention barometer that can be customized based on the type of content shown during the user experience. If a high level of attention, if for education, a content developer can design an environment for the experience that will provide the user the "best" environment for an experience. For example, tune the ambience lighting so the user can be at the optimal levels to learn during the experience.

In some implementations, an emotional state may be determined by using statistical or machine learning-based classification techniques. For example, determining that the user has a respiratory state and an emotional state includes using a machine learning model trained using ground truth data that includes self-assessments in which users labelled portions of experiences with emotional state labels. For example, to determine the ground truth data that includes self-assessments, a group of subjects, while watching different types of emotionally engaging and non-engaging videos, could be prompted at different time intervals (e.g., every 30 seconds). Alternatively, or additionally, the ground truth data that includes self-assessments while watching a video includes different examples of highly positive and negative valenced events. For example, after each "event" or video, each subject could be prompted at or after a particular event in the video content to enter his or her emotional state. For example, a user could be provided an emotional rating scale to select (e.g., on a scale 1-10) what emotions the user felt during the event (e.g., a Differential Emotions Scale (DES), a Levels of Emotional Awareness Scale (LEAS), and the like).

In some implementations, the method 700 further includes identifying emotional states of the user corresponding to multiple periods of time, and presenting indications of progress based on the emotional states. For example, identifying emotional states of the user maybe based on user input or feedback during the presentation of content (e.g., an emotional log during the meditation experience) and/or identifying emotional states of the user may be based on the obtained physiological data or behavioral data.

In some implementations, the content is presented to multiple users during a communication session. For example, a couple or a group of people (e.g., 2 or more) may share a meditation experience together in an XR environment. The shared experience may include an instructor and a patient, where the instructor (or any other person) can educate the user on ways to better meditate during presentation of the content (e.g., follow a particular path, or focus on particular visual and/or audio content, such as a bird chirping or a waterfall).

In some implementations, one or more pupillary or EEG characteristics may be determined, aggregated, and used to classify the emotional state using statistical or machine learning techniques. In some implementations, the physiological data is classified based on comparing the variability of the physiological data to a threshold. For example, if the baseline for a user's EEG data is determined during an initial segment of time (e.g., 30-60 seconds), and during a subsequent segment of time following an auditory stimulus (e.g., 5 seconds) the EEG data deviates more than +/−10% from the EEG baseline during the subsequent segment of time, than the techniques described herein could classify the user as transitioned away from the high (positively) or low (negatively) valenced emotional state and entered a second lower/higher emotional state. Similarly, the heart rate data and/or EDA data may also be classified based on comparing the variability of the heart rate data and/or EDA data to a particular threshold.

In some implementations, the machine learning model is a neural network (e.g., an artificial neural network), decision tree, support vector machine, Bayesian network, or the like. These labels may be collected from the user beforehand, or from a population of people beforehand, and fine-tuned later on individual users. Creating this labeled data may require many users going through an experience (e.g., a meditation experience) where the users listen to natural sounds with intermixed natural-probes (e.g., an auditory stimulus) and then randomly are asked how focused or relaxed they were (e.g., emotional state) shortly after a probe was presented. The answers to these questions can generate a label for the time prior to the question and a deep neural network or deep long short term memory (LSTM) network might learn a combination of features specific to that user or task given those labels (e.g., negative emotional state, positive emotional state, etc.).

At block 706, the method 700 determines a scene understanding of an environment based on identifying one or more objects in the environment utilizing the one or more sensors. In some implementations, the environment may be a physical environment, a virtual environment, or an XR environment. In some implementations, determining a scene understanding may include identifying one or more of the objects in a room and their respective positions in the room (e.g., based on images of the user's current room, depth data, etc.).

In some implementations, the sensor data includes image data such as light intensity image data and/or depth data from one or more depth sensors (e.g., a structured light, a time-of-flight, or the like) of the physical environment. In some implementations, the sensor data includes location data of the user (e.g., user 110) and/or the device (e.g., device 105).

In some implementations, determining a scene understanding may include determining a context associated with a use of the device in the environment based on sensor data from the one or more sensors. For example, identifying a context of the scene may determining that a user is at a birthday party (e.g., a birthday cake is identified), a sporting event (e.g., a scoreboard for a game is identified). Additionally, or alternatively, a context of associated with a use of the device in the environment may be based on accessing a calendar application (e.g., the user is scheduled to be at a party at the current time).

In some implementations, recording the event may include modifying an appearance of the one or more objects based on the position for the one or more objects and/or based on the emotional state. For example, the techniques described herein can detect and remove (or fade away) potential distractions, such as other people while meditating. In some examples, the people maybe faded away based on a threshold distance (e.g., further that 10 feet away from the viewer). Additionally, as the object becomes closer to the suer (e.g., less than 10 feet), then the object may fade back in within the view.

At block 708, the method 700 determines to record an event occurring in the environment based on the emotional state and the scene understanding, and at block 710 the method 700 records the event utilizing the one or more sensors. For example, according to techniques described herein, if an event is determined to be a positively valenced event, object, or situation (e.g., based on an emotional level threshold), then a recording of that event is obtained by one or more sensors. For example, recording an event may include capturing light intensity images via an external facing camera to capture a physical environment, or a content recording of a XR or virtual environment from the user's point of view (e.g., while wearing an HMD). In some implementations, the recording of the event is based on a point of view of the device (e.g., a user's point of view).

In some implementations, the method 700 further includes presenting the recording of the event. For example, each recording of the events may be stored in a database (e.g., content recordings database 665), and accessed by the device that recorded the event, or accessed by a user of the device at another device (e.g., cloud-based access on another electronic device via a secure access protocol).

In some implementations, the method 700 further includes identifying the recording of the event for the first period of time as a highly positively valenced event based on a comparison of the level of the positively valenced emotion corresponding to the emotional state to a positively valenced threshold. For example, identifying a highly positively valenced event may include detecting extensive smiling/laughing, thus triggering a recording of the event.

In some implementations, the method 700 further includes determining to end the recording of the event for the first period of time based on a criterion. In other words, after the initiation of the recording, determining when to discontinue the capture. In some implementations, determining to end the recording of the event for the first period of time may be based on predetermined time periods (e.g., record for one thirty seconds once a highly positive valenced emotional state is detected). Additionally, or alternatively, determining to end the recording of the event for the first period of time may be based on detecting an emotional trigger moment, and when that moment has passed (e.g., joke ended, a particular segment of a video ended, etc.). Additionally, or alternatively, determining to end the recording of the event for the first period of time may be based on identifying when an emotional level has been determined to be below a threshold. Additionally, or alternatively, determining to end the recording of the event for the first period of time may be based on the scene understanding, such as identifying when the event has ended (e.g., birthday celebration ended after candles are blown out, etc.).

In some implementations, the recording of the event includes a cue configured to trigger a change in the emotional state. In some implementations, the recording of the event includes a graphical indicator or sound configured to change a first emotional state to a second emotional state. In an exemplary implementation, the recordings of the positively valenced events, objects, or situations may be utilized to be recommended to the user when he or she may be feeling stressful, anxious, or nervous as identified by the sensors on the device. In an exemplary implementation, the method 700 further includes determining a second emotional state during a second period of time based on the physiological data or the behavioral data, and providing a recommendation (e.g., a notification) to present the recording of the event of the first period of time based on the second emotional state. In some implementations, the emotional state during the second period of time includes a negatively valenced state (e.g., responses to aversive situations or context, such as fear, anxiety, and loss). For example, detecting the user is in a negatively valenced emotional state (e.g., stressed/anxious), and providing a notification (e.g., visual and/or audible) to request permission to present a recording a previous event to increase level of the emotional state more positively (e.g., playing a recording of the event from the celebrity video call as illustrated in FIG. 4).

In some implementations, baseline tracking may be utilized. In an exemplary implementation, the method 700 further includes determining a baseline corresponding to the emotional state based on the physiological or behavioral data, determining a goal (e.g., a positively valenced level of emotion) for the user based on the baseline, and modifying a presentation of content associated with a second event based on the baseline and the goal. For example, during meditation experiences, a baseline for emotional state may be determined and used during future meditation experiences as a goal to obtain during each experience.

In some implementations, the method 700 determines a modification to the content based on the emotional state. For example, the determined emotional state could be used to provide feedback to the user via the content enhancement which may aid the user, provide statistics to the user, and/or help content creators improve the content of the experience. In some aspects, the content enhancement may be the start or end of an experience or an change during an ongoing experience. In some implementations, the method 700 presents an instruction for the user to be attentive to a physical action (e.g., smiling), assesses a level of positively valenced emotion to the physical action based on the physiological data or behavioral data and the emotional state, and presents an updated sequence of content that is modified based on the level of positively valenced emotion.

In some implementations, a modification of the content includes a graphical indicator or sound that indicates to the user that the current event is being recorded (e.g., recording element 310). In some aspects, the content enhancement may provide a visualization of current emotional state or desired/improved emotional state such as oscillations using a smile/frown icon. Alternatively, an interactive icon may be used to encourage a user to smile. In some aspects, the content enhancement may use subtle cues change from lighter to darker ambience and/or bells, audio, chimes to encourage a more positively valenced emotional level.

In some implementations, feedback can be provided to a user based on determining that the emotional state (e.g., playing a video game, watching a movie, etc.) differs from an intended emotional state of the experience (e.g., content developer wants to increase a positively valenced emotional level for a particular portion of the video game, movie, etc.). In some implementations, the method 700 may further include presenting feedback (e.g., audio feedback such as "smile", visual feedback, etc.) during the experience in response to determining that the emotional state differs from a second emotional state intended for the experience.

In some implementations, the emotional state is a first respiratory state and a first emotional state, and the method further includes obtaining, using a sensor, first physiological data (e.g., EEG amplitude, pupil movement, etc.) associated with a physiological response (or lack of response) of the user to the content enhancement, and determining a second respiratory state and second emotional state based on the physiological response of the user to the content enhancement. In some implementations, the method further includes assessing the second respiratory state and the second emotional state based on the physiological response of the user to the content enhancement, and determining whether the content enhancement reduced stress of the user by comparing the second respiratory state and the second emotional state to the first respiratory state and the first emotional state. For example, the respiratory state and the emotional state may be compared with the user's own prior responses or typical user responses to similar stimuli. The respiratory state and the emotional state may be determined using statistical or machine learning-based classification techniques. Additionally, the determined respiratory state and the emotional states could be used to provide feedback to the user/reorient the user, provide statistics to the user, or help content creators in creating a more effective meditation experience, learning experience, breathing, workday, and the like.

In some implementations, a context analysis may be obtained or generated, to determine what content the user is focusing on that is creating an increase (or decrease) in an emotional state, which may include a scene understanding of the content and/or the physical environment. In an exemplary implementation, the method 700 may further include identifying the portion of the experience associated with the respiratory state and the emotional state. For example, identifying a portion of the experience associated with a particularly high respiratory state and/or low emotional state (e.g., over a threshold), the data may provide a recommendation (or dissuasion) of similar content or portions of the content to the user or to help the content developer improve the content for future users. For example, maybe the goal of the content developer is to increase stress in a video game, decrease stress for a meditation experience, or increase stress if a user is "bored" while studying or at work (e.g., to improve attention/respiration performance levels).

In some implementations, the method 700 determines a context of the experience based on sensor data of the environment. For example, determining a context may involve using computer vision to generate a scene understanding of the visual and/or auditory attributes of the environment—where is the user, what is the user doing, what objects are nearby. Additionally, a scene understanding of the content presented to the user could be generated that includes the visual and/or auditory attributes of what the user was watching.

In some aspects, different contexts of the content presented and the environment are analyzed to determine where the user is, what the user is doing, what objects or people are nearby in the environment or within the content, what the user did earlier (e.g., meditated in the morning). Additionally, context analysis may include image analysis (semantic segmentation), audio analysis (jarring sounds), location sensors (where user is), motion sensors (fast moving vehicle), and even access other user data (e.g., a user's calendar). In an exemplary implementation, the method 700 may further include determining the context of the experience by generating a scene understanding of the environment based on the sensor data of the environment, the scene understanding including visual or auditory attributes of the environment and determining the context of the experience based on the scene understanding of the environment.

In some implementations, the sensor data includes image data, and generating the scene understanding is based at least on performing semantic segmentation of the image data and detecting one or more objects within the environment based on the semantic segmentation. In some implementations, determining the context of the experience includes determining an activity of the user based on the scene understanding of the environment. In some implementations, the sensor data includes location data of the user, and determining the context of the experience includes determining a location of the user within the environment based on the location data.

In some implementations, determining the context of the experience may involve identifying an object or individual with which the user is interacting. Determining the context of the experience may involve determining that the user is conversing with another individual. Determining the context of the experience may involve determining that an interaction or conversation with another individual is likely (or unlikely) to evoke a highly positive emotional state, or negative/stressful state. Assessing whether an individual is more or less likely to evoke a positive or negative/stressful response for the user may involve identifying the individual, and classifying the individual based on appearance of the individual, based on an action of the individual, and/or based on an activity that the individual is engaged in. For example, if the other individual is identified as the user's boss at work, the boss can be identified via facial recognition, or be classified as a supervising coworker. The stress of the user can then be tracked based on his or her emotional states when interacting with that individual that was classified as his or her boss. Providing feedback to a user (or his or her instructor) regarding the user's lower/negatively valenced emotional states when interacting with his or her boss, may be useful when evaluating stress therapy techniques to better cope with high stress situations. Additionally, the shared experience may include a group of users sharing the common interest of meditating as a group, where the XR environment would enhance to the group's collective experience and/or an individual's experience.

In some implementations, determining the context of the experience may involve determining a scene understanding or scene knowledge that a particular location (e.g., a particular room, building, etc.) that a user experiences is more or less likely to lead to a positively high valenced emotional state or a negative/stressful state (e.g., based on past stressful experiences that occurred there). For example, determining a scene understanding or scene knowledge of an experience may involve monitoring low level characteristics of a scene that can evoke stress. For example, loud noises, looming sounds, bright flashes of light, sirens, rumbling sounds, and the like, may be monitored and analyzed as part of the scene understanding or scene knowledge. Additionally, scene knowledge may provide information that a particular activity or content might be troubling or stressful. For example, scene knowledge may include experiences or event that the user is currently participating in such as interviewing, reading a disturbing news story, watching a scary movie, playing a violent video game, and the like. Understanding scene knowledge may involve other stressful experiences such as threatening stimuli (e.g., an aggressive dog), harm done to a loved one, perceived physical danger to the user (e.g., an oncoming car), online bullying, being berated in person, and the like.

In some implementations, determining the context of the experience includes determining an activity of the user based on a user's schedule. For example, the system may access a user's calendar to determine if a particular event is occurring when the particular respiratory state and the emotional state is assessed (e.g., a scheduled meditation session, the user is late for an important meeting or class, or is scheduled to present in front of a group in the near future).

In some implementations, customization of the experience, and whether or not to record the event, could be controlled by the user. For example, a user could select the experience he or she desires, such as he or she can choose the ambience, background scene, music, etc. for a highly positive valenced emotional state. Additionally, the user could alter the threshold of providing the content enhancement. For example, the user can customize the sensitivity of triggering the recording or a content enhancement based on prior experiences. For example, for some experiences, a user may not want to record the particular event.

Figure 8:
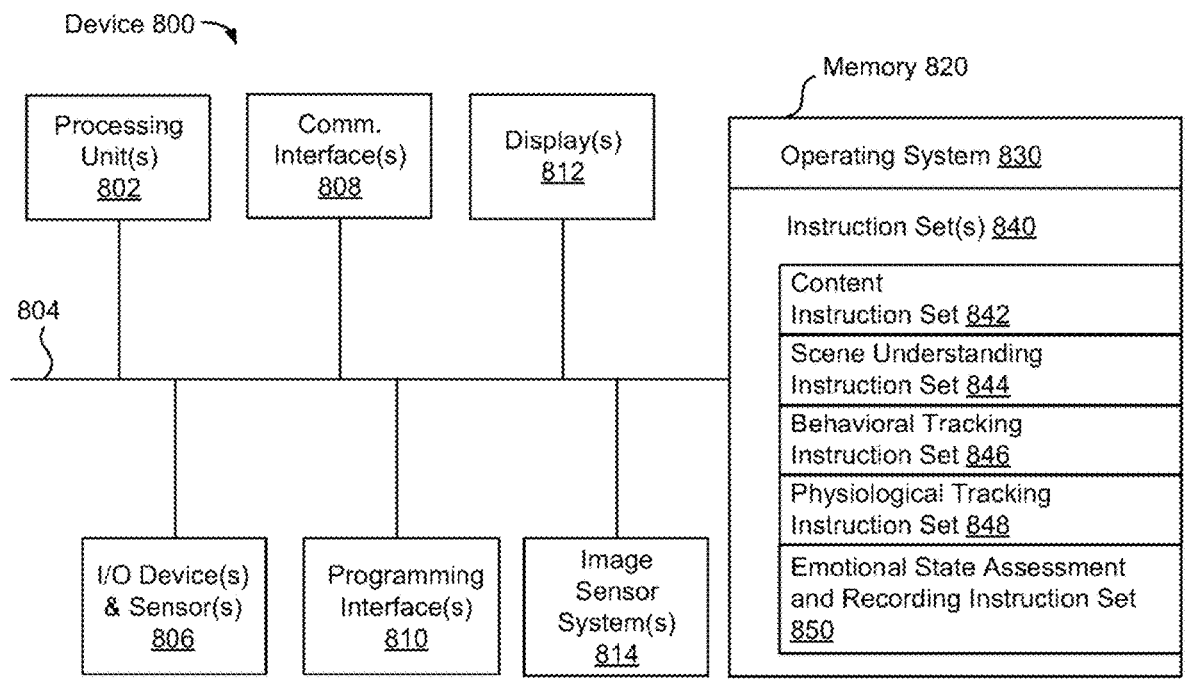
FIG. 8 illustrates device components of an exemplary device in accordance with some implementations.

FIG. 8 is a block diagram of an example device 800. Device 800 illustrates an exemplary device configuration for device 105. While certain specific features are illustrated, those skilled in the art will appreciate from the present disclosure that various other features have not been illustrated for the sake of brevity, and so as not to obscure more pertinent aspects of the implementations disclosed herein. To that end, as a non-limiting example, in some implementations the device 800 includes one or more processing units 802 (e.g., microprocessors, ASICs, FPGAs, GPUs, CPUs, processing cores, and/or the like), one or more input/output (I/O) devices and sensors 806, one or more communication interfaces 808 (e.g., USB, FIREWIRE, THUNDERBOLT, IEEE 802.3x, IEEE 802.11x, IEEE 802.16x, GSM, CDMA, TDMA, GPS, IR, BLUETOOTH, ZIGBEE, SPI, 12C, and/or the like type interface), one or more programming (e.g., I/O) interfaces 810, one or more displays 812, one or more interior and/or exterior facing image sensor systems 814, a memory 820, and one or more communication buses 804 for interconnecting these and various other components.

In some implementations, the one or more communication buses 804 include circuitry that interconnects and controls communications between system components. In some implementations, the one or more I/O devices and sensors 806 include at least one of an inertial measurement unit (IMU), an accelerometer, a magnetometer, a gyroscope, a thermometer, one or more physiological sensors (e.g., blood pressure monitor, heart rate monitor, blood oxygen sensor, blood glucose sensor, etc.), one or more microphones, one or more speakers, a haptics engine, one or more depth sensors (e.g., a structured light, a time-of-flight, or the like), and/or the like.

In some implementations, the one or more displays 812 are configured to present a view of a physical environment or a graphical environment to the user. In some implementations, the one or more displays 812 correspond to holographic, digital light processing (DLP), liquid-crystal display (LCD), liquid-crystal on silicon (LCoS), organic light-emitting field-effect transitory (OLET), organic light-emitting diode (OLED), surface-conduction electron-emitter display (SED), field-emission display (FED), quantum-dot light-emitting diode (QD-LED), micro-electromechanical system (MEMS), and/or the like display types. In some implementations, the one or more displays 812 correspond to diffractive, reflective, polarized, holographic, etc. waveguide displays. In one example, the device 800 includes a single display. In another example, the device 800 includes a display for each eye of the user.

In some implementations, the one or more image sensor systems 814 are configured to obtain image data that corresponds to at least a portion of the physical environment 100. For example, the one or more image sensor systems 814 include one or more RGB cameras (e.g., with a complimentary metal-oxide-semiconductor (CMOS) image sensor or a charge-coupled device (CCD) image sensor), monochrome cameras, IR cameras, depth cameras, event-based cameras, and/or the like. In various implementations, the one or more image sensor systems 814 further include illumination sources that emit light, such as a flash. In various implementations, the one or more image sensor systems 814 further include an on-camera image signal processor (ISP) configured to execute a plurality of processing operations on the image data.

The memory 820 includes high-speed random-access memory, such as DRAM, SRAM, DDR RAM, or other random-access solid-state memory devices. In some implementations, the memory 820 includes non-volatile memory, such as one or more magnetic disk storage devices, optical disk storage devices, flash memory devices, or other non-volatile solid-state storage devices. The memory 820 optionally includes one or more storage devices remotely located from the one or more processing units 802. The memory 820 includes a non-transitory computer readable storage medium.

In some implementations, the memory 820 or the non-transitory computer readable storage medium of the memory 820 stores an optional operating system 830 and one or more instruction set(s) 840. The operating system 830 includes procedures for handling various basic system services and for performing hardware dependent tasks. In some implementations, the instruction set(s) 840 include executable software defined by binary information stored in the form of electrical charge. In some implementations, the instruction set(s) 840 are software that is executable by the one or more processing units 802 to carry out one or more of the techniques described herein.

The instruction set(s) 840 include a content instruction set 842, a scene understanding instruction set 844, a behavioral tracking instruction set 846, a physiological tracking instruction set 848, and a emotional state assessment and recording instruction set 850. The instruction set(s) 840 may be embodied a single software executable or multiple software executables.

In some implementations, the content instruction set 842 is executable by the processing unit(s) 802 to provide and/or track content for display on a device. The content instruction set 842 may be configured to monitor and track the content over time (e.g., during an experience such as an education session) and/or to identify change events that occur within the content. In some implementations, the content instruction set 842 may be configured to inject change events into content (e.g., content enhancements) using one or more of the techniques discussed herein or as otherwise may be appropriate. To these ends, in various implementations, the instruction includes instructions and/or logic therefor, and heuristics and metadata therefor.

In some implementations, the scene understanding instruction set 844 is executable by the processing unit(s) 802 to determine a context of the experience and/or the environment (e.g., create a scene understanding to determine the objects or people in the content or in the environment, where the user is, what the user is watching, etc.) using one or more of the techniques discussed herein (e.g., object detection, facial recognition, etc.) or as otherwise may be appropriate. To these ends, in various implementations, the instruction includes instructions and/or logic therefor, and heuristics and metadata therefor.

In some implementations, the behavioral tracking instruction set 846 is executable by the processing unit(s) 802 to tracking a location of a user and/or a device of the user using one or more of the techniques discussed herein or as otherwise may be appropriate. To these ends, in various implementations, the instruction includes instructions and/or logic therefor, and heuristics and metadata therefor.

In some implementations, the physiological tracking instruction set 848 is executable by the processing unit(s) 802 to track a user's physiological attributes (e.g., EEG amplitude/frequency, pupil modulation, eye gaze saccades, heart rate, EDA data, etc.) using one or more of the techniques discussed herein or as otherwise may be appropriate.

To these ends, in various implementations, the instruction includes instructions and/or logic therefor, and heuristics and metadata therefor.

In some implementations, the emotional state assessment and recording instruction set 850 is executable by the processing unit(s) 802 to assess the emotional state of a user based on physiological data (e.g., eye gaze response), behavioral data, and context data of the content and/or environment using one or more of the techniques discussed herein or as otherwise may be appropriate. To these ends, in various implementations, the instruction includes instructions and/or logic therefor, and heuristics and metadata therefor.

Although the instruction set(s) 840 are shown as residing on a single device, it should be understood that in other implementations, any combination of the elements may be located in separate computing devices. Moreover, FIG. 8 is intended more as functional description of the various features which are present in a particular implementation as opposed to a structural schematic of the implementations described herein. As recognized by those of ordinary skill in the art, items shown separately could be combined and some items could be separated. The actual number of instructions sets and how features are allocated among them may vary from one implementation to another and may depend in part on the particular combination of hardware, software, and/or firmware chosen for a particular implementation.

Figure 9:
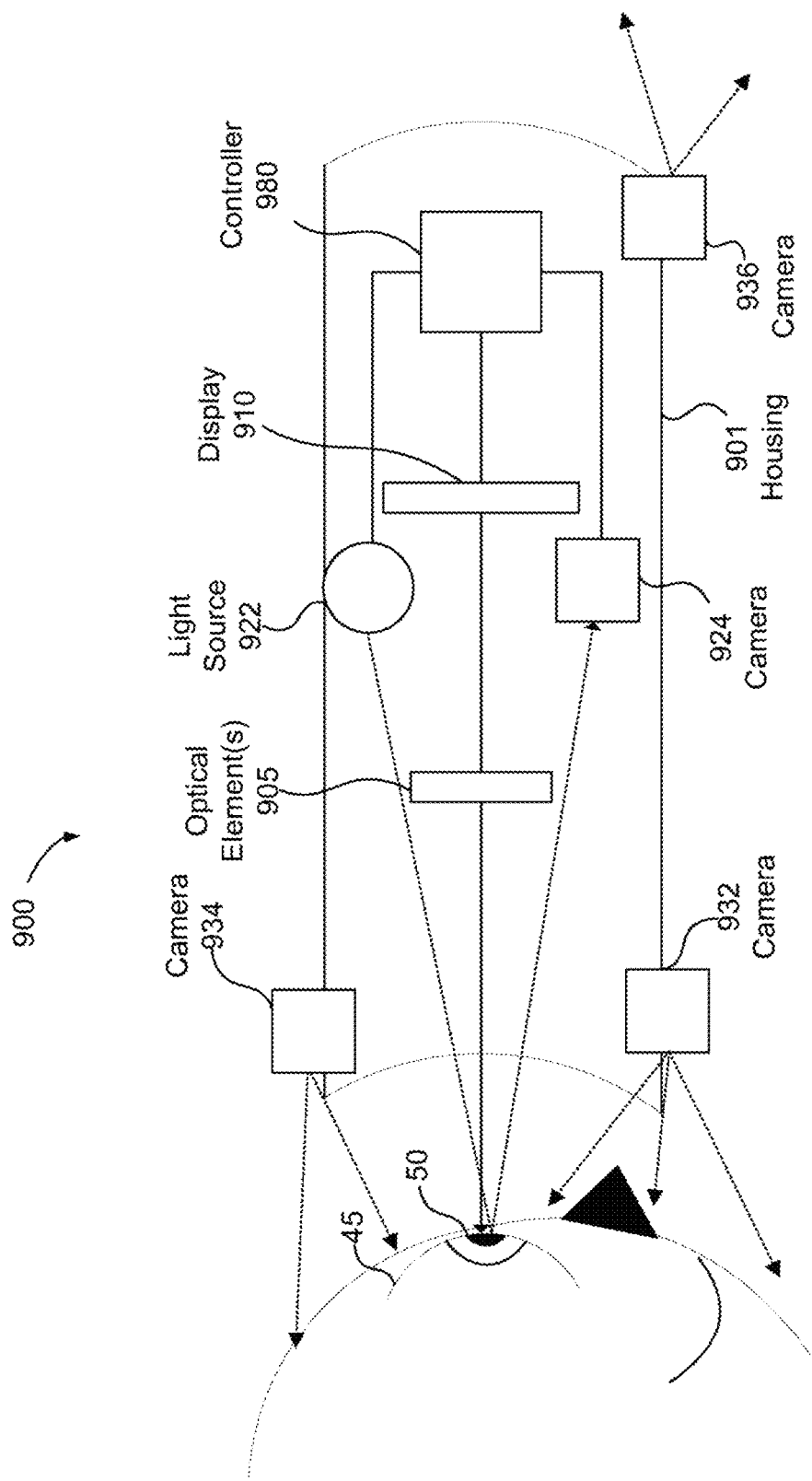
FIG. 9 illustrates an example head-mounted device (HMD) in accordance with some implementations.

FIG. 9 illustrates a block diagram of an exemplary head-mounted device 900 in accordance with some implementations. The head-mounted device 900 includes a housing 901 (or enclosure) that houses various components of the head-mounted device 900. The housing 901 includes (or is coupled to) an eye pad (not shown) disposed at a proximal (to the user 110) end of the housing 901. In various implementations, the eye pad is a plastic or rubber piece that comfortably and snugly keeps the head-mounted device 900 in the proper position on the face of the user 110 (e.g., surrounding the eye 45 of the user 110).

The housing 901 houses a display 910 that displays an image, emitting light towards or onto the pupil 50 of an eye 45 of a user 110. In various implementations, the display 910 emits the light through an eyepiece having one or more optical elements 905 that refracts the light emitted by the display 910, making the display appear to the user 110 to be at a virtual distance farther than the actual distance from the eye to the display 910. For example, optical element(s) 905 may include one or more lenses, a waveguide, other diffraction optical elements (DOE), and the like. For the user 110 to be able to focus on the display 910, in various implementations, the virtual distance is at least greater than a minimum focal distance of the eye (e.g., 7 cm). Further, in order to provide a better user experience, in various implementations, the virtual distance is greater than 1 meter.

The housing 901 also houses a tracking system including one or more light sources 922, camera 924, camera 932, camera 934, camera 936, and a controller 980. The one or more light sources 922 emit light onto the eye of the user 110 that reflects as a light pattern (e.g., a circle of glints) that can be detected by the camera 924. Based on the light pattern, the controller 980 can determine an eye tracking characteristic of the user 110. For example, the controller 980 can determine a gaze direction and/or a blinking state (eyes open or eyes closed) of the user 110. As another example, the controller 980 can determine a pupil center, a pupil size, or a point of regard associated with the pupil 50. Thus, in various implementations, the light is emitted by the one or more light sources 922, reflects off the eye of the user 110, and is detected by the camera 924. In various implementations, the light from the eye of the user 110 is reflected off a hot mirror or passed through an eyepiece before reaching the camera 924.

The display 910 emits light in a first wavelength range and the one or more light sources 922 emit light in a second wavelength range. Similarly, the camera 924 detects light in the second wavelength range. In various implementations, the first wavelength range is a visible wavelength range (e.g., a wavelength range within the visible spectrum of approximately 400-700 nm) and the second wavelength range is a near-infrared wavelength range (e.g., a wavelength range within the near-infrared spectrum of approximately 700-1400 nm).

In various implementations, eye tracking (or, in particular, a determined gaze direction) is used to enable user interaction (e.g., the user 110 selects an option on the display 910 by looking at it), provide foveated rendering (e.g., present a higher resolution in an area of the display 910 the user 110 is looking at and a lower resolution elsewhere on the display 910), or correct distortions (e.g., for images to be provided on the display 910).

In various implementations, the one or more light sources 922 emit light towards the eye of the user 110 which reflects in the form of a plurality of glints.

In various implementations, the camera 924 is a frame/shutter-based camera that, at a particular point in time or multiple points in time at a frame rate, generates an image of the eye of the user 110. Each image includes a matrix of pixel values corresponding to pixels of the image which correspond to locations of a matrix of light sensors of the camera. In implementations, each image is used to measure or track pupil dilation by measuring a change of the pixel intensities associated with one or both of a user's pupils.

In various implementations, the camera 924 is an event camera including a plurality of light sensors (e.g., a matrix of light sensors) at a plurality of respective locations that, in response to a particular light sensor detecting a change in intensity of light, generates an event message indicating a particular location of the particular light sensor.

In various implementations, the camera 932, camera 934, and camera 936 are frame/shutter-based cameras that, at a particular point in time or multiple points in time at a frame rate, can generate an image of the face of the user 110 or capture an external physical environment. For example, camera 932 captures images of the user's face below the eyes, camera 934 captures images of the user's face above the eyes, and camera 936 captures the external environment of the user (e.g., environment 100 of FIG. 1). The images captured by camera 932, camera 934, and camera 936 may include light intensity images (e.g., RGB) and/or depth image data (e.g., Time-of-Flight, infrared, etc.).

Returning to FIG. 1, a physical environment refers to a physical world that people can sense and/or interact with without aid of electronic devices. The physical environment may include physical features such as a physical surface or a physical object. For example, the physical environment corresponds to a physical park that includes physical trees, physical buildings, and physical people. People can directly sense and/or interact with the physical environment such as through sight, touch, hearing, taste, and smell. In contrast, an extended reality (XR) environment refers to a wholly or partially simulated environment that people sense and/or interact with via an electronic device. For example, the XR environment may include augmented reality (AR) content, mixed reality (MR) content, virtual reality (VR) content, and/or the like. With an XR system, a subset of a person's physical motions, or representations thereof, are tracked, and, in response, one or more characteristics of one or more virtual objects simulated in the XR environment are adjusted in a manner that comports with at least one law of physics. As one example, the XR system may detect head movement and, in response, adjust graphical content and an acoustic field presented to the person in a manner similar to how such views and sounds would change in a physical environment. As another example, the XR system may detect movement of the electronic device presenting the XR environment (e.g., a mobile phone, a tablet, a laptop, or the like) and, in response, adjust graphical content and an acoustic field presented to the person in a manner similar to how such views and sounds would change in a physical environment. In some situations (e.g., for accessibility reasons), the XR system may adjust characteristic(s) of graphical content in the XR environment in response to representations of physical motions (e.g., vocal commands).

There are many different types of electronic systems that enable a person to sense and/or interact with various XR environments. Examples include head mountable systems, projection-based systems, heads-up displays (HUDs), vehicle windshields having integrated display capability, windows having integrated display capability, displays formed as lenses designed to be placed on a person's eyes (e.g., similar to contact lenses), headphones/earphones, speaker arrays, input systems (e.g., wearable or handheld controllers with or without haptic feedback), smartphones, tablets, and desktop/laptop computers. A head mountable system may have one or more speaker(s) and an integrated opaque display. Alternatively, a head mountable system may be configured to accept an external opaque display (e.g., a smartphone). The head mountable system may incorporate one or more imaging sensors to capture images or video of the physical environment, and/or one or more microphones to capture audio of the physical environment. Rather than an opaque display, a head mountable system may have a transparent or translucent display. The transparent or translucent display may have a medium through which light representative of images is directed to a person's eyes. The display may utilize digital light projection, OLEDs, LEDs, uLEDs, liquid crystal on silicon, laser scanning light source, or any combination of these technologies. The medium may be an optical waveguide, a hologram medium, an optical combiner, an optical reflector, or any combination thereof. In some implementations, the transparent or translucent display may be configured to become opaque selectively. Projection-based systems may employ retinal projection technology that projects graphical images onto a person's retina. Projection systems also may be configured to project virtual objects into the physical environment, for example, as a hologram or on a physical surface.

It will be appreciated that the implementations described above are cited by way of example, and that the present invention is not limited to what has been particularly shown and described hereinabove. Rather, the scope includes both combinations and sub combinations of the various features described hereinabove, as well as variations and modifications thereof which would occur to persons skilled in the art upon reading the foregoing description and which are not disclosed in the prior art.

As described above, one aspect of the present technology is the gathering and use of physiological data to improve a user's experience of an electronic device with respect to interacting with electronic content. The present disclosure contemplates that in some instances, this gathered data may include personal information data that uniquely identifies a specific person or can be used to identify interests, traits, or tendencies of a specific person. Such personal information data can include physiological data, demographic data, location-based data, telephone numbers, email addresses, home addresses, device characteristics of personal devices, or any other personal information.

The present disclosure recognizes that the use of such personal information data, in the present technology, can be used to the benefit of users. For example, the personal information data can be used to improve interaction and control capabilities of an electronic device. Accordingly, use of such personal information data enables calculated control of the electronic device. Further, other uses for personal information data that benefit the user are also contemplated by the present disclosure.

The present disclosure further contemplates that the entities responsible for the collection, analysis, disclosure, transfer, storage, or other use of such personal information and/or physiological data will comply with well-established privacy policies and/or privacy practices. In particular, such entities should implement and consistently use privacy policies and practices that are generally recognized as meeting or exceeding industry or governmental requirements for maintaining personal information data private and secure. For example, personal information from users should be collected for legitimate and reasonable uses of the entity and not shared or sold outside of those legitimate uses. Further, such collection should occur only after receiving the informed consent of the users. Additionally, such entities would take any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices.

Despite the foregoing, the present disclosure also contemplates implementations in which users selectively block the use of, or access to, personal information data. That is, the present disclosure contemplates that hardware or software elements can be provided to prevent or block access to such personal information data. For example, in the case of user-tailored content delivery services, the present technology can be configured to allow users to select to "opt in" or "opt out" of participation in the collection of personal information data during registration for services. In another example, users can select not to provide personal information data for targeted content delivery services. In yet another example, users can select to not provide personal information, but permit the transfer of anonymous information for the purpose of improving the functioning of the device.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, content can be selected and delivered to users by inferring preferences or settings based on non-personal information data or a bare minimum amount of personal information, such as the content being requested by the device associated with a user, other non-personal information available to the content delivery services, or publicly available information.

In some embodiments, data is stored using a public/private key system that only allows the owner of the data to decrypt the stored data. In some other implementations, the data may be stored anonymously (e.g., without identifying and/or personal information about the user, such as a legal name, username, time and location data, or the like). In this way, other users, hackers, or third parties cannot determine the identity of the user associated with the stored data. In some implementations, a user may access his or her stored data from a user device that is different than the one used to upload the stored data. In these instances, the user may be required to provide login credentials to access their stored data.

Numerous specific details are set forth herein to provide a thorough understanding of the claimed subject matter. However, those skilled in the art will understand that the claimed subject matter may be practiced without these specific details. In other instances, methods, apparatuses, or systems that would be known by one of ordinary skill have not been described in detail so as not to obscure claimed subject matter.

Unless specifically stated otherwise, it is appreciated that throughout this specification discussions utilizing the terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provides a result conditioned on one or more inputs. Suitable computing devices include multipurpose microprocessor-based computer systems accessing stored software that programs or configures the computing system from a general purpose computing apparatus to a specialized computing apparatus implementing one or more implementations of the present subject matter. Any suitable programming, scripting, or other type of language or combinations of languages may be used to implement the teachings contained herein in software to be used in programming or configuring a computing device.

Implementations of the methods disclosed herein may be performed in the operation of such computing devices. The order of the blocks presented in the examples above can be varied for example, blocks can be re-ordered, combined, or broken into sub-blocks. Certain blocks or processes can be performed in parallel.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or value beyond those recited. Headings, lists, and numbering included herein are for ease of explanation only and are not meant to be limiting.

It will also be understood that, although the terms "first," "second," etc. may be used herein to describe various objects, these objects should not be limited by these terms. These terms are only used to distinguish one object from another. For example, a first node could be termed a second node, and, similarly, a second node could be termed a first node, which changing the meaning of the description, so long as all occurrences of the "first node" are renamed consistently and all occurrences of the "second node" are renamed consistently. The first node and the second node are both nodes, but they are not the same node.

The terminology used herein is for the purpose of describing particular implementations only and is not intended to be limiting of the claims. As used in the description of the implementations and the appended claims, the singular forms "a," "an," and "the" are intended to include the plural forms as well, unless the context clearly indicates otherwise. It will also be understood that the term "or" as used herein refers to and encompasses any and all possible combinations of one or more of the associated listed items. It will be further understood that the terms "comprises" or "comprising," when used in this specification, specify the presence of stated features, integers, steps, operations, objects, or components, but do not preclude the presence or addition of one or more other features, integers, steps, operations, objects, components, or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

The foregoing description and summary of the invention are to be understood as being in every respect illustrative and exemplary, but not restrictive, and the scope of the invention disclosed herein is not to be determined only from the detailed description of illustrative implementations but according to the full breadth permitted by patent laws. It is to be understood that the implementations shown and described herein are only illustrative of the principles of the present invention and that various modification may be implemented by those skilled in the art without departing from the scope and spirit of the invention.

What is claimed is:

1. A method comprising:
at a device having a processor and one or more sensors:
obtaining physiological data or behavioral data during a first period of time utilizing the one or more sensors;
determining an emotional state during the first period of time based on the physiological data or the behavioral data, wherein the emotional state is determined based on determining a level of positively valenced emotion corresponding to the emotional state;
determining a scene understanding of an environment, wherein the scene understanding is determined based on identifying one or more objects in the environment utilizing the one or more sensors;
determining to record image content associated with an event occurring in the environment based on the emotional state and the scene understanding;
recording the image content associated with the event utilizing the one or more sensors; and
identifying the recording of the image content associated with the event for the first period of time as a highly positively valenced event based on a comparison of the level of the positively valenced emotion corresponding to the emotional state to a positively valenced threshold.

2. The method of claim 1, further comprising:
providing feedback based on determining the emotional state.

3. The method of claim 1, further comprising:
presenting the recording of the image content associated with the event.

4. The method of claim 1, further comprising:
determining a second emotional state during a second period of time based on the physiological data or the behavioral data; and
providing a recommendation to present the recording of the image content associated with the event of the first period of time based on the second emotional state.

5. The method of claim 4, wherein the emotional state during the second period of time comprises a negatively valenced state.

6. The method of claim 1, wherein the recording of the image content associated with the event is based on a point of view of the device.

7. The method of claim 1, wherein the emotional state comprises a positively valenced state.

8. The method of claim 1, wherein the recording of the image content associated with the event comprises a visual or audible representation of the emotional state or a change to the emotional state.

9. The method of claim 1, wherein the recording of the image content associated with the event comprises a cue configured to trigger a change in the emotional state.

10. The method of claim 1, wherein the recording of the image content associated with the event comprises a graphical indicator or sound configured to change a first emotional state to a second emotional state.

11. The method of claim 1, wherein the emotional state is determined based on using the physiological data to determine head pose, sounds, jaw movement, cheek movement, nose movement, movement of tissue surrounding an eye, or a signal of a face.

12. The method of claim 1, wherein the emotional state is determined based on using the physiological data to measure gaze or body movements.

13. The method of claim 1, further comprising:
determining to end the recording of the image content associated with the event for the first period of time based on a criterion.

14. The method of claim 1, wherein determining the scene understanding of the environment comprises:
determining a position for the one or more objects.

15. The method of claim 14, wherein recording the image content associated with the event comprises:
modifying an appearance of the one or more objects based on the position for the one or more objects.

16. The method of claim 1, wherein determining the scene understanding of the environment comprises determining a context associated with a use of the device in the environment based on sensor data from the one or more sensors.

17. The method of claim 1, wherein determining to record the image content associated with the event occurring in the environment is based on using a machine learning classifier model, wherein the physiological data or the behavioral data are input into the machine learning classification model to identify one or more emotional events.

18. The method of claim 1, further comprising:
presenting an instruction for a viewer to be attentive to a physical action;

assessing a level of positively valenced emotion to the physical action based on the physiological data or behavioral data and the emotional state; and
presenting an updated sequence of content that is modified based on the level of positively valenced emotion.

19. The method of claim 1, further comprising:
determining a baseline corresponding to the emotional state based on the physiological data or behavioral data;
determining a goal based on the baseline; and
modifying a presentation of content associated with a second event based on the baseline and the goal.

20. The method of claim 1, wherein the recording of the image content associated with the event is presented to multiple users during a communication session.

21. The method of claim 1, wherein the environment is a physical environment, an extended reality (XR) environment, or a virtual environment.

22. A device comprising:
one or more sensors;
a non-transitory computer-readable storage medium; and
one or more processors coupled to the non-transitory computer-readable storage medium, wherein the non-transitory computer-readable storage medium comprises program instructions that, when executed on the one or more processors, cause the one or more processors to perform operations comprising:
obtaining physiological data or behavioral data during a first period of time utilizing the one or more sensors;
determining an emotional state during the first period of time based on the physiological data or the behavioral data, wherein the emotional state is determined based on determining a level of positively valenced emotion corresponding to the emotional state;
determining a scene understanding of an environment, wherein the scene understanding is determined based on identifying one or more objects in the environment utilizing the one or more sensors;
determining to record image content associated with an event occurring in the environment based on the emotional state and the scene understanding;
recording the image content associated with the event utilizing the one or more sensors; and
identifying the recording of the image content associated with the event for the first period of time as a highly positively valenced event based on a comparison of the level of the positively valenced emotion corresponding to the emotional state to a positively valenced threshold.

23. A non-transitory computer-readable storage medium, storing program instructions executable on a device to perform operations by one or more processors comprising:
obtaining physiological data or behavioral data during a first period of time utilizing one or more sensors;
determining an emotional state during the first period of time based on the physiological data or the behavioral data, wherein the emotional state is determined based on determining a level of positively valenced emotion corresponding to the emotional state;
determining a scene understanding of an environment, wherein the scene understanding is determined based on identifying one or more objects in the environment utilizing the one or more sensors;
determining to record image content associated with an event occurring in the environment based on the emotional state and the scene understanding;

recording the image content associated with the event utilizing the one or more sensors; and identifying the recording of the image content associated with the event for the first period of time as a highly positively valenced event based on a comparison of the level of the positively valenced emotion corresponding to the emotional state to a positively valenced threshold.

* * * * *